United States Patent
Takagi et al.

(10) Patent No.: US 11,064,410 B2
(45) Date of Patent: Jul. 13, 2021

(54) BASE-STATION APPARATUS, COMMUNICATION SYSTEM, AND COMMUNICATION METHOD

(71) Applicant: SHARP KABUSHIKI KAISHA, Sakai (JP)

(72) Inventors: Yuhsuke Takagi, Sakai (JP); Katsutoshi Ishikura, Sakai (JP); Atsushi Yamazaki, Sakai (JP); Hideyuki Nakanishi, Sakai (JP); Ryoki Hinata, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 29 days.

(21) Appl. No.: 16/782,375

(22) Filed: Feb. 5, 2020

(65) Prior Publication Data
US 2020/0252845 A1    Aug. 6, 2020

(30) Foreign Application Priority Data

Feb. 5, 2019  (JP) .............................. JP2019-018936

(51) Int. Cl.
*H04W 4/00*  (2018.01)
*H04W 36/06*  (2009.01)
(Continued)

(52) U.S. Cl.
CPC ........... *H04W 36/06* (2013.01); *H04W 28/08* (2013.01); *H04W 36/22* (2013.01); *H04W 36/38* (2013.01)

(58) Field of Classification Search
USPC ........ 370/328, 329, 229, 237; 455/436, 439, 455/453
See application file for complete search history.

(56) References Cited

U.S. PATENT DOCUMENTS

| | | | | |
|---|---|---|---|---|
| 8,082,507 B2* | 12/2011 | Speicher | ................. | H04L 69/24 715/740 |
| 2014/0164640 A1* | 6/2014 | Ye | ........................... | H04L 47/30 709/235 |

(Continued)

FOREIGN PATENT DOCUMENTS

JP  2014-512763 A  5/2014
WO  WO-2011135790 A1 *  11/2011  .............. H04W 4/70

*Primary Examiner* — David Q Nguyen
(74) *Attorney, Agent, or Firm* — ScienBiziP, P.C.

(57) ABSTRACT

A base-station apparatus includes: a communicator that performs wireless communication; and a controller. During communication with at least a first terminal apparatus, when a communication volume used for communication that is newly stated with a second terminal apparatus becomes smaller than or equal to an un-used communication volume, the controller transmits, to a target terminal apparatus that is one of the first and second terminal apparatuses, a communication instruction for communication with a second base-station apparatus having a coverage range in which the target terminal apparatus is located, and when a communication volume used for communication with the target terminal apparatus exceeds the un-used communication volume, the controller transmits a callback instruction for callback from the second base-station apparatus to the base-station apparatus to the target terminal apparatus or the second base-station apparatus.

10 Claims, 20 Drawing Sheets

(51) Int. Cl.
 *H04W 28/08* (2009.01)
 *H04W 36/38* (2009.01)
 *H04W 36/22* (2009.01)

(56) References Cited

U.S. PATENT DOCUMENTS

| | | | |
|---|---|---|---|
| 2014/0235242 A1 | 8/2014 | Granzow et al. | |
| 2014/0307626 A1* | 10/2014 | Hintersteiner | H04W 52/243 |
| | | | 370/328 |
| 2015/0351147 A1* | 12/2015 | Jain | H04L 65/104 |
| | | | 370/329 |
| 2020/0259737 A1* | 8/2020 | Koshy | H04W 28/0967 |

\* cited by examiner

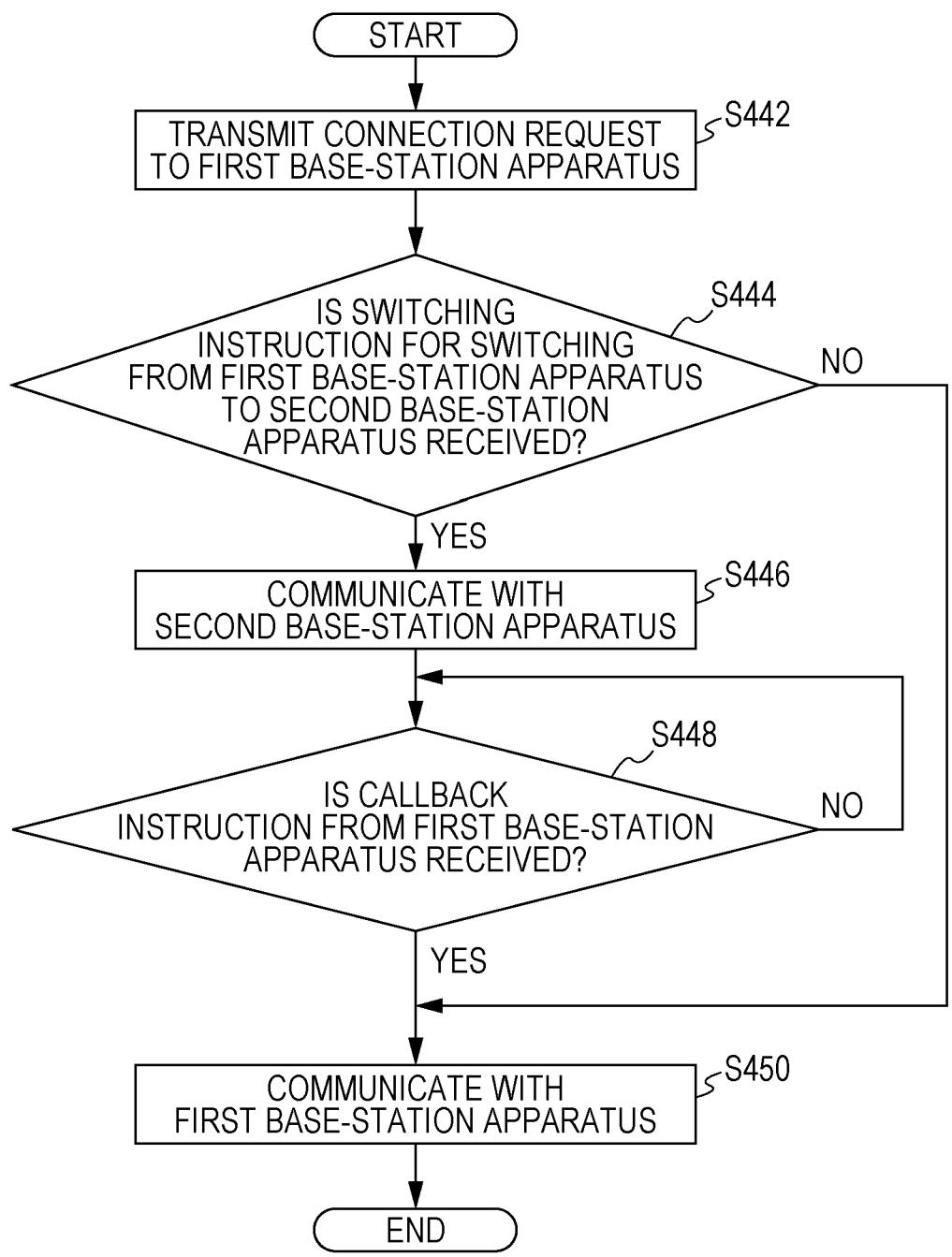

BASE-STATION APPARATUS, COMMUNICATION SYSTEM, AND COMMUNICATION METHOD

BACKGROUND

1. Field

The present disclosure relates to a base-station apparatus, a communication system, and a communication method.

2. Description of the Related Art

In general, wireless communication systems each include a plurality of base-station apparatuses to provide wireless communication services to individual terminal apparatuses. In each wireless communication system, coverage areas of the respective base-station apparatuses are spatially arranged to collectively form a service area in which communication services can be provided. The "coverage areas" as used herein refer to areas in which each base-station apparatus transmits/receives radio waves to make it possible to provide the communication services to the terminal apparatuses.

In the service area, the base-station apparatuses are generally arranged so that the coverage areas overlap each other. There are cases in which multiple terminal apparatuses are located in each coverage area at the same time and perform communication individually. Depending on the number of connecting terminal apparatuses and the communication quality, each base-station apparatus may distribute communication traffic used for communication with another base-station apparatus.

For example, Japanese Unexamined Patent Application Publication (Translation of PCT Application) No. 2014-512763 discloses a wireless communication system in which a user terminal issues, by using functions of a network with which the user terminal is communicating, a move request to thereby realize movement to another wireless network. More specifically, when congestion or a sign thereof occurs in a wireless communication system based on a Long-Term Evolution (LTE) system, movement (redirection) processing is performed to allow a communicating terminal apparatus to perform communication using a base-station apparatus in another wireless communication system based on a wideband code division multiple access (W-CDMA®) system.

However, it is difficult for the terminal apparatus in the related art to know the communication state of a base-station apparatus connected before the movement. Thus, even when congestion is eliminated or reduced in a network used before change, it is difficult for the terminal apparatus to return to communication using a base-station apparatus connected before the change.

One aspect of the present disclosure has been made in view of the foregoing and provides a base-station apparatus, a communication system, and a communication method that allow the communication of a terminal apparatus for which a base-station apparatus has been changed to be called back to a pre-changing base-station apparatus.

SUMMARY

According to an aspect of the disclosure, there is provided a base-station apparatus including: a communicator that performs wireless communication; and a controller. During communication with at least a first terminal apparatus, in a first case in which a communication volume used for communication that is newly stated with a second terminal apparatus becomes smaller than or equal to an un-used communication volume, the controller transmits, to a target terminal apparatus that is one of the first terminal apparatus and the second terminal apparatus, a communication instruction for communication with a second base-station apparatus that is different from the base-station apparatus and that has a coverage range in which the target terminal apparatus is located, and in a second case in which a communication volume used for communication with the target terminal apparatus exceeds the un-used communication volume, the controller transmits a callback instruction for callback from the second base-station apparatus to the base-station apparatus to the target terminal apparatus or the second base-station apparatus.

BRIEF DESCRIPTION OF THE DRAWINGS

FIG. 27 is a flowchart illustrating a processing example of a terminal apparatus according to the modification of the second embodiment.

DESCRIPTION OF THE EMBODIMENTS

First Embodiment

A first embodiment of the present disclosure will be described below with reference to the accompanying drawings.

First, a description will be given of a communication system 1, which is one example of a communication system according to the present embodiment.

Figure 1:
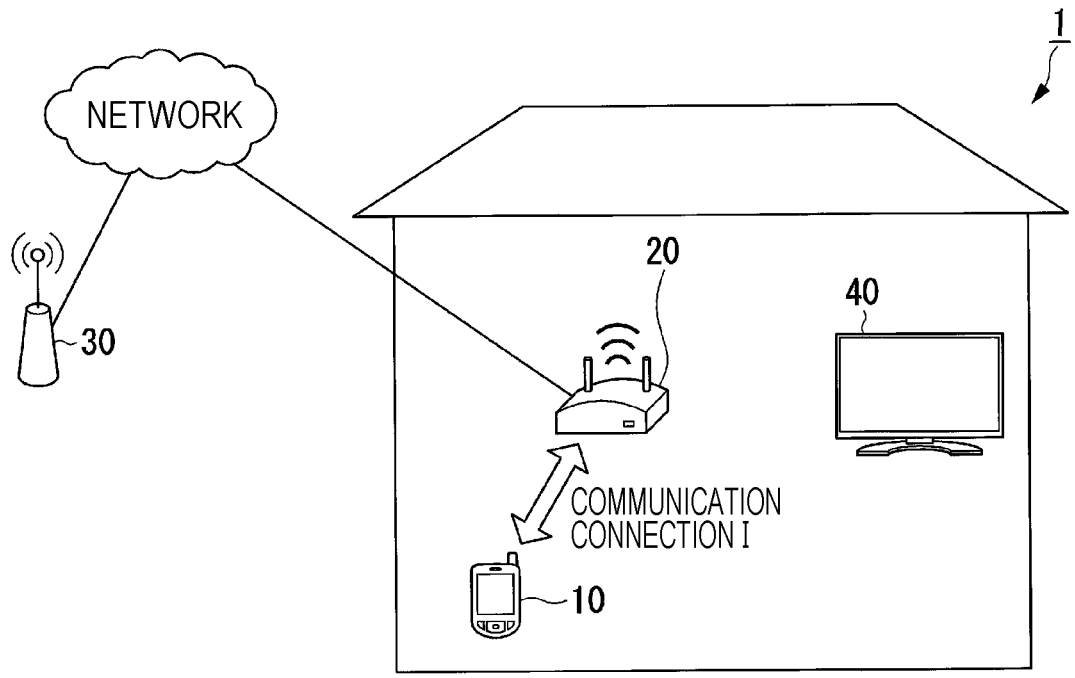
FIG. 1 is a conceptual diagram illustrating a first case in a communication system according to a first embodiment.
Figure 2:
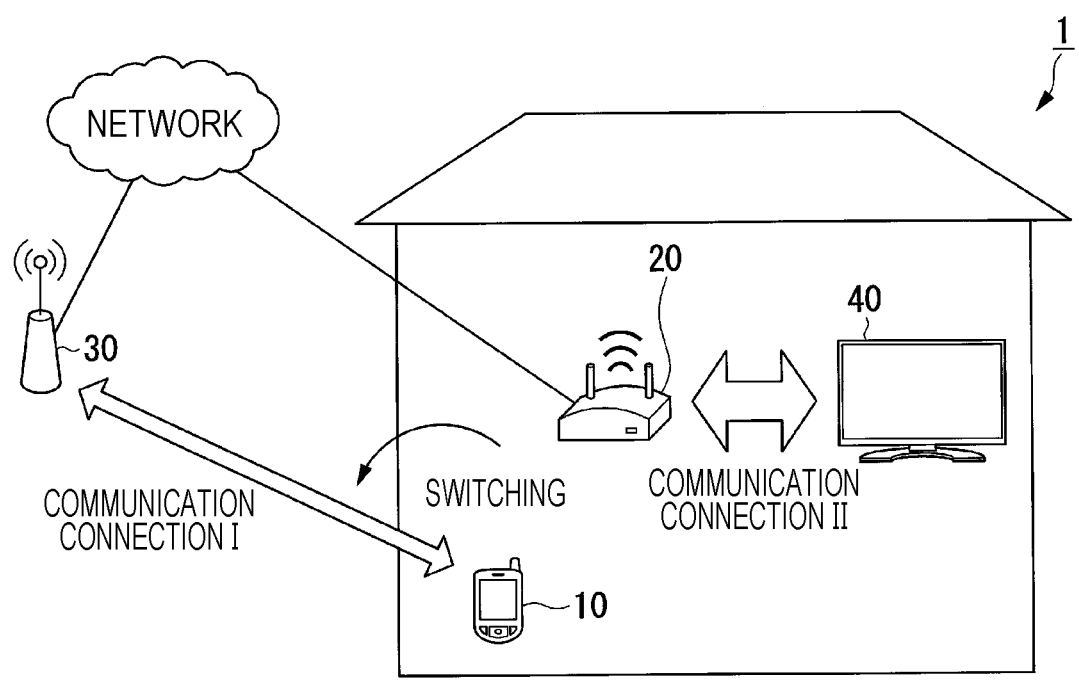
FIG. 2 is a conceptual diagram illustrating a second case in the communication system according to the first embodiment.
Figure 3:
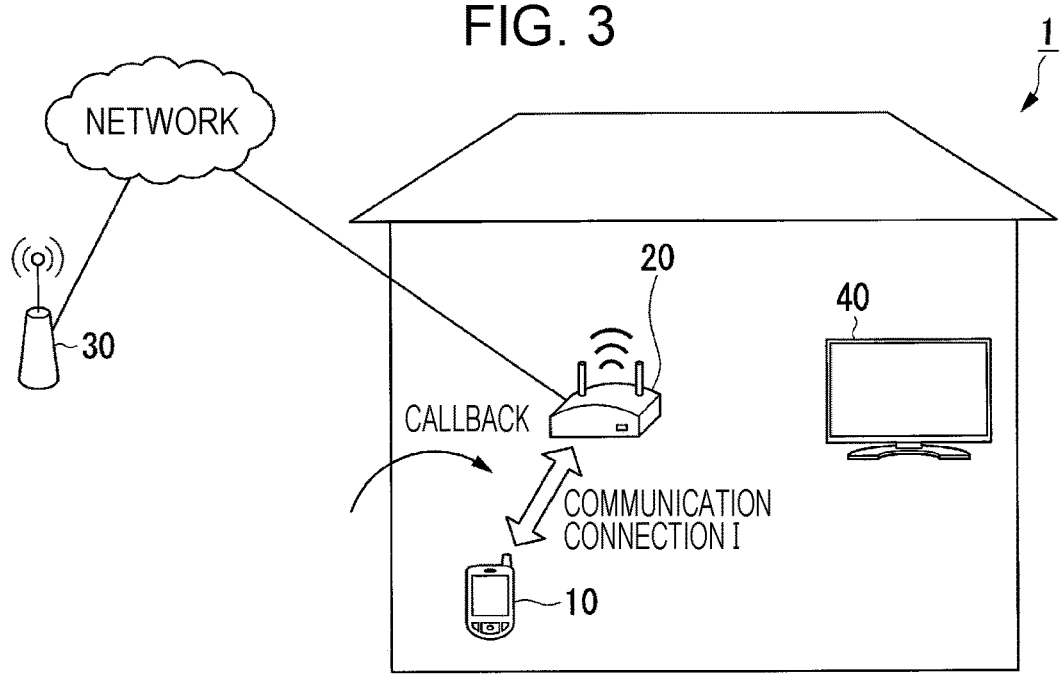
FIG. 3 is a conceptual diagram illustrating a third case in the communication system according to the first embodiment.

FIGS. 1 to 3 are conceptual diagrams illustrating one example of the communication system 1 according to the present embodiment.

The communication system 1 includes a plurality of base-station apparatuses and one or more terminal apparatuses. The base-station apparatuses can communicate with each terminal apparatus by using respective predetermined wireless communication systems. The predetermined wireless communication systems may be, for example, any of the fifth generation (5G) mobile telecommunication system, Long-Term Evolution (LTE), Wideband Code Division Multiple Access (W-CDMA®), and so on. In the example illustrated in FIGS. 1 to 3, the number of base-station apparatuses is two. In the following description, the two base-station apparatuses are respectively referred to as a "first base-station apparatus 20" and a "second base-station apparatus 30" to distinguish therebetween. The first base-station apparatus 20 is placed indoors, the second base-station apparatus 30 is placed outdoors, and each of the first base-station apparatus 20 and the second base-station apparatus 30 forms a public mobile communications network. In general, the number of base-station apparatuses in the communication system 1 may be three or more.

The number of terminal apparatuses that are located in the range of coverage (hereinafter referred to as the "coverage range") of the first base-station apparatus 20 is two, and the number of terminal apparatuses that are located in the coverage range of the second base-station apparatus 30 is one. The number of terminal apparatuses that are located in the coverage range of each of the first base-station apparatus 20 and the second base-station apparatus 30 may be three or more or may be zero. In the following description, the two terminal apparatuses are respectively referred to as a "terminal apparatus 10" and "electronic equipment 40" to distinguish therebetween. The terminal apparatus 10 is, for example, an information processing terminal, such as a mobile phone (which may be the so-called smartphone), a tablet terminal device, or a personal computer. The terminal apparatus 10 is in the coverage ranges of the first base-station apparatus 20 and the second base-station apparatus 30, whereas the electronic equipment 40 is in the coverage range of the first base-station apparatus 20 and is outside the coverage range of the second base-station apparatus 30. The electronic equipment 40 is, for example, equipment having a function of continuously transmitting or receiving a large amount of data. Examples of the electronic equipment 40 include a television and a recorder.

A case in which the terminal apparatus 10 is a mobile phone, and the electronic equipment 40 is an ultra-high-definition television (UHDTV) having a communication function will be described in the example illustrated in FIGS. 1 to 3. The electronic equipment 40 can receive, for example, 4K broadcast or 8K broadcast (hereinafter referred to collectively as "broadcast"). In 4K broadcast, video having 3840 horizontal pixels×2160 vertical pixels and having a frame rate of 30 or 60 frames per second is broadcast. In 8K broadcast, video having 7680 horizontal pixels×4320 vertical pixels and having a frame rate of 60 or 120 frames per second is broadcast. When the Internet of Things (IoT) is incorporated into more home electrical appliances, and the communication functions are widely used in the home electrical appliances, receiving broadcast data through communications networks is also expected to become widespread independently from the existing television broadcast using broadcast radio waves. There is a possibility that, in order to receive 8K broadcast, the electronic equipment 40 occupies a majority of wireless resources (which may hereinafter be referred to as "resources") that can be provided by the first base-station apparatus 20.

In the above-described wireless communication system, when the communication quality declines owing to movement, the terminal apparatus 10 switches a base-station apparatus used for communication (this base-station apparatus is hereinafter referred to as a "serving base-station apparatus") to a base-station apparatus that can provide a higher communication quality. For example, when the terminal apparatus 10 enters the premises while communicating with the second base-station apparatus 30, the terminal apparatus 10 establishes a connection (a communication connection I) with the first base-station apparatus 20 through switching ("handover", FIG. 1) thereto to continue the communication. Suppose a situation in which an instruction for starting the operation of the electronic equipment 40 is given (a power supply thereof is turned on) to start receiving 8K broadcast, there is a possibility that a maximum communication volume with which the first base-station apparatus 20 can provide a stable communication quality is exceeded to cause congestion in the communication with the first base-station apparatus 20. Accordingly, for establishing a connection (a communication connection II) with the electronic equipment 40, the first base-station apparatus 20 transmits, to the terminal apparatus 10 that is to be enabled to communicate with the second base-station apparatus 30 that is different from the first base-station apparatus 20, communication instruction information indicating switching (redirection) of the serving base-station apparatus to the second base-station apparatus 30, and stores switching communication information regarding the terminal apparatus 10 to which the communication instruction information is transmitted and the second base-station apparatus 30 that is the switching destination ("switching" in FIG. 2).

Thereafter, when the electronic equipment 40 is instructed to end operating (the power supply is turned off) and ends receiving broadcast data via the first base-station apparatus 20, resources that can be provided by the first base-station apparatus 20 become available. At this point in time, since the communication volume used for communication greatly falls below the maximum communication volume, the possibility that congestion occurs is low even if the first base-station apparatus 20 newly starts communication with the terminal apparatus 10. Accordingly, the first base-station apparatus 20 transmits, to the second base-station apparatus 30, callback instruction information indicating callback of the serving base-station apparatus for the terminal apparatus 10 to the first base-station apparatus 20 ("callback" in FIG. 3). The second base-station apparatus 30 transmits a switching instruction for switching to the first base-station apparatus 20 to the terminal apparatus 10 with which the second base-station apparatus 30 is communicating, the terminal apparatus 10 breaks the communication connection I with the second base-station apparatus 30, and re-establishes the communication connection I with the first base-station apparatus 20 to continue the communication.

(Terminal Apparatus)

Next, a description will be given of a configuration example of the terminal apparatus 10 according to the present embodiment.

Figure 4:
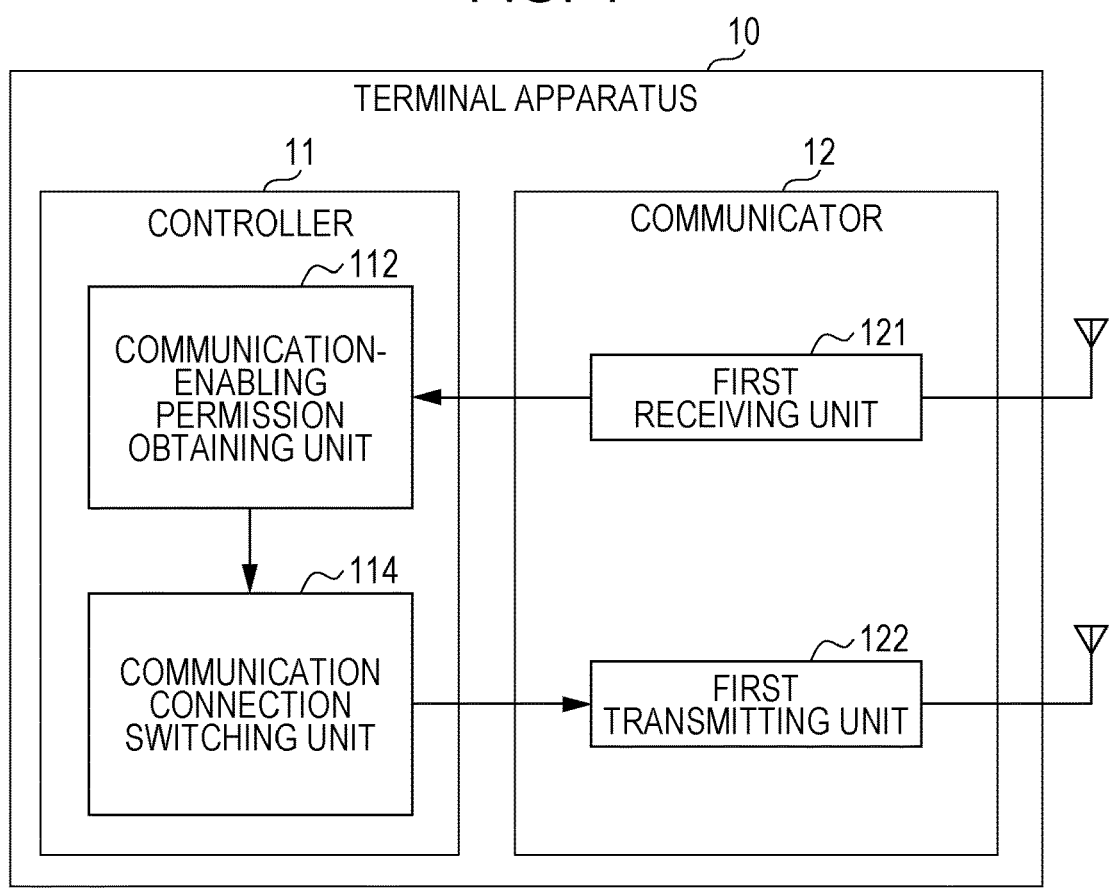
FIG. 4 is a schematic block diagram illustrating a configuration example of a terminal apparatus according to the first embodiment.

FIG. 4 is a schematic block diagram illustrating a configuration example of the terminal apparatus 10 according to the present embodiment.

The terminal apparatus 10 includes a controller 11 and a communicator 12.

The controller 11 controls various functions of the terminal apparatus 10. The controller 11 includes, for example, one or more processors, such as a central processing unit (CPU), and a storage medium, such as a read-only memory (ROM) or a random-access memory (RAM). Each processor may realize functions of the individual units described below, by reading a program pre-stored in the storage medium and performing processing indicated by an instruction written in the read program.

The controller 11 performs processing related to communication based on a predetermined wireless communication system. Examples of the processing performed by the controller 11 include connection processing at the start of communication, disconnection processing at the end of communication, processing on transmission signals (e.g., acquisition, encoding, packetization, modulation, and so on of transmission signals), processing on reception signals (e.g., demodulation, signal retrieval from packets, and decoding), measurement of reference signals (including reference signals received from a base-station apparatus that is connected and a base-station apparatus that is not connected) included in reception signals, reporting of measurement results, and carrier frequency control and so on on the communicator 12. When communication is started, the controller 11 may transmit communication-start request information, including pre-stored terminal information (described below) of the terminal apparatus 10, to the serving base-station apparatus by using the communicator 12.

The controller 11 includes a communication-enabling permission obtaining unit 112 and a communication connection switching unit 114. The communication-enabling permission obtaining unit 112 uses the communicator 12 to obtain communication instruction information included in reception signals received from a base-station apparatus (e.g., the second base-station apparatus 30) connected at this point in time. The communication instruction information obtained in this case may be switching instruction information indicating switching of the serving base-station apparatus that is connected at this point in time to another base-station apparatus (e.g., the first base-station apparatus 20) or communication instruction information indicating use of another base-station apparatus. The communication-enabling permission obtaining unit 112 may also obtain callback instruction information indicating callback of the serving base-station apparatus to a base-station apparatus connected before switching (this base-station apparatus may hereinafter be referred to as a "pre-switching base-station apparatus". The callback instruction information indicates that there is no congestion in the pre-switching base-station apparatus or the possibility of the congestion is eliminated or reduced to thereby enable communication. The communication instruction information may include a base station identifier (ID) indicating a base station with which the terminal apparatus 10 can communicate. The communication-enabling permission obtaining unit 112 outputs the obtained communication instruction information or callback instruction information to the communication connection switching unit 114.

In response to the communication instruction information input from the communication-enabling permission obtaining unit 112, the communication connection switching unit 114 switches the serving base-station apparatus to the base-station apparatus indicated by the communication instruction information. More specifically, the communication connection switching unit 114 transmits communication-start request information to the base-station apparatus indicated by the base station ID included in the communication instruction information. Upon receiving communication-start notification information as a response to the communication-start request information, the communication connection switching unit 114 outputs, to the communicator 12, a control signal indicating switching of the serving base-station apparatus to the base-station apparatus that is the transmission destination of the communication-start request information. Thus, the communication connection switching unit 114 can cause the communicator 12 to switch the base-station apparatus, to establish a connection with the pre-switching base-station apparatus, and to start communication therewith.

Similarly, in response to the switching instruction information input from the communication-enabling permission obtaining unit 112, the communication connection switching unit 114 switches the serving base-station apparatus to the base-station apparatus indicated by the switching instruction information. In this case, the communication connection switching unit 114 transmits communication-start request information indicating a communication start to the base-station apparatus indicated by the switching instruction information. Upon receiving the communication-start notification information as a response to the communication-start request information, the communication connection switching unit 114 outputs, to the communicator 12, a control signal indicating switching of the serving base-station apparatus to the base-station apparatus that is the transmission destination of the communication-start request information.

The communicator 12 communicates with the base-station apparatus in accordance with the predetermined wireless communication system. The communicator 12 may be configured, for example, as a wireless communication interface. The communicator 12 includes a first receiving unit 121 and a first transmitting unit 122.

The first receiving unit 121 outputs reception signals, received as radio waves from the base-station apparatus via an antenna, to the controller 11.

The first transmitting unit 122 supplies transmission signals, input from the controller 11, to an antenna to transmit the transmission signals to the base-station apparatus as radio waves.

The electronic equipment 40 may also have a configuration that is the same as or similar to that of the above-described terminal apparatus 10.

(Base-Station Apparatus)

Next, a description will be given of configuration examples of the base-station apparatuses according to the present embodiment. The following description will be mainly given of a case in which during communication between the terminal apparatus 10 and the first base-station apparatus 20, the serving base-station apparatus for the terminal apparatus 10 is switched from the first base-station apparatus 20 to the second base-station apparatus 30 and is then called back from the second base-station apparatus 30 to the first base-station apparatus 20. In this case, a description will be mainly given of functions and configurations of the first base-station apparatus 20 that is a switching source and the second base-station apparatus 30 that is a switching destination. Thus, the first base-station apparatus 20 and the second base-station apparatus 30 may have a functional configuration of the second base-station apparatus 30 and a functional configuration of the first base-station apparatus 20, respectively.

Figure 5:
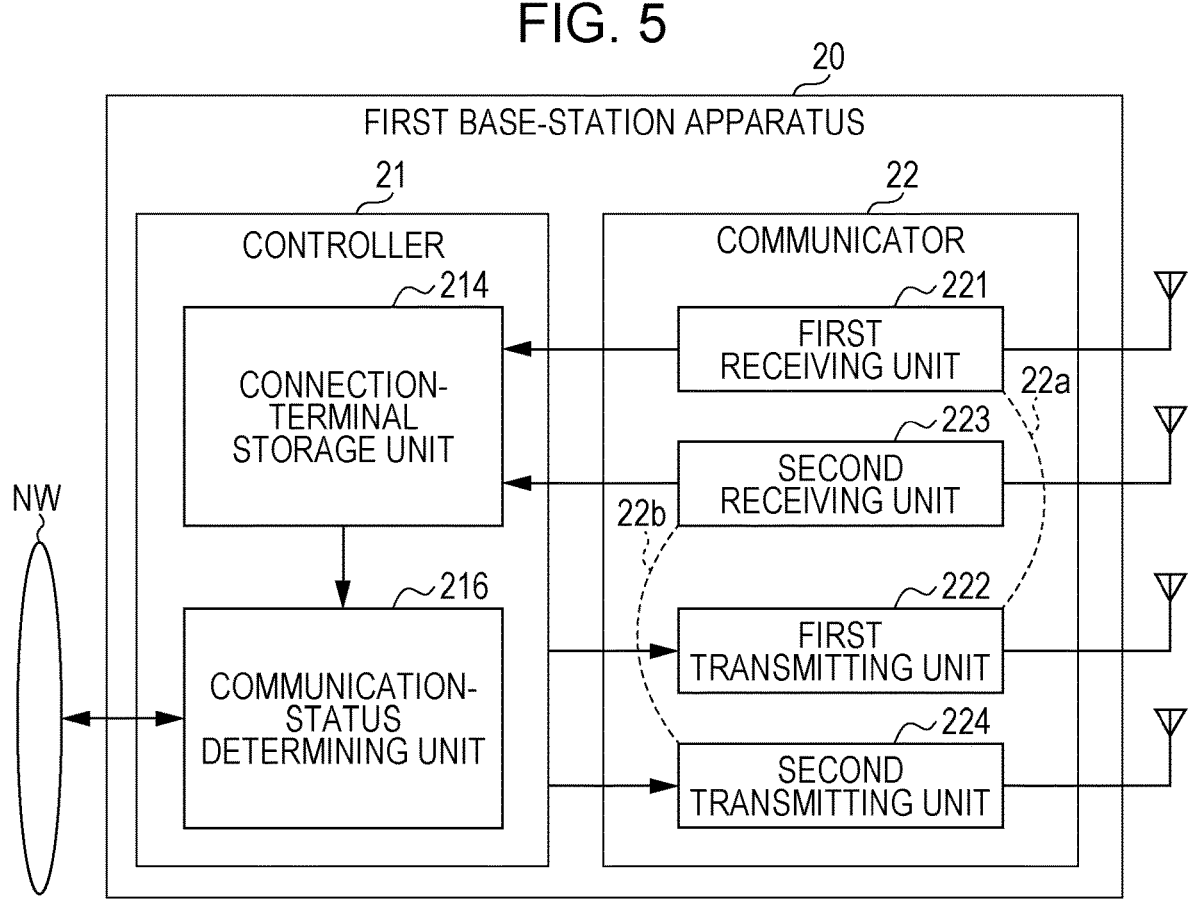
FIG. 5 is a schematic block diagram illustrating a configuration example of a first base-station apparatus according to the first embodiment.

FIG. 5 is a schematic block diagram illustrating a configuration example of the first base-station apparatus 20 according to the present embodiment.

The first base-station apparatus 20 includes a controller 21 and a communicator 22.

The controller 21 controls various functions of the first base-station apparatus 20. The controller 21 includes, for example, one or more processors and a storage medium. Each processor may realize functions of the individual units described below, by reading a program pre-stored in the storage medium and performing processing indicated by an instruction written in the read program.

The controller 21 performs general processing related to communication based on the predetermined wireless communication system. Examples of the processing performed by the controller 21 include connection processing related to start of communication, disconnection processing related to end of communication, setting of a communication route, transmission of measurement settings to each terminal apparatus, reception of a measurement report, processing on transmission signals (e.g., allocation to wireless resources set for individual terminal apparatuses with respect to transmission signals received from a core network that realizes communication by using a first wireless communication system or customer-premises equipment (CPE) that realizes communication by using a second wireless communication system and that is connected to the first base-station apparatus 20), processing on reception signals (e.g., demodulation of reception signals received from terminal apparatuses, retrieval and demodulation of reception signals from wireless resources for individual terminal apparatuses, and transmission to a core network or CPE), allocation of wireless resources on the basis of a measurement report, and carrier frequency control on the communicator 12.

The controller 21 includes a connection-terminal storage unit 214 and a communication-status determining unit 216.

The connection-terminal storage unit 214 stores terminal information regarding each terminal apparatus 10 that is connected to the first base-station apparatus 20 at this point in time. The terminal information includes at least identification information of the corresponding terminal apparatus 10. The terminal information regarding each terminal apparatus 10 includes, for example, information of the International Mobile Equipment Identifier (IMEI). The IMEI includes a type approval code (TAC), a final assembly code (FAC), a serial number (SNR), and a check digit. The TAC indicates a manufacturer and a model-specific number. The FAC indicates the country of origin. The terminal information may further include type information, which is information indicating the type of terminal apparatus 10. The type (terminal type) of terminal apparatus 10 is identified with one of or both the TAC and the type information. The communication volume used for communication differs depending on the terminal type. The terminal information and time-point information indicating a time point at which the communication-start notification information is received or a time point at which a communication start is determined may be stored in the connection-terminal storage unit 214 in association with each other.

For example, when communication is started, the controller 21 retrieves the terminal information from the communication-start notification information received from the terminal apparatus 10. The controller 21 may also retrieve the terminal information from attach request information received from the terminal apparatus 10. The attach request information is obtained from the terminal apparatus 10 that is located in the coverage range of the first base-station apparatus 20, before an operation, such as communication, is started.

Upon determining that communication with the terminal apparatus 10 is to be started, the controller 21 stores the retrieved terminal information in the connection-terminal storage unit 214. Also, upon determining that communication between the terminal apparatus 10 and another party of the communication is to be ended or a connection therebetween is to be broken, the controller 21 deletes the terminal information of the terminal apparatus 10 which is related to the connection.

The communication-status determining unit 216 reads the terminal information for each terminal apparatus, the terminal information being stored in the connection-terminal storage unit 214. The communication-status determining unit 216 determines a terminal apparatus that performs communication with the first base-station apparatus 20 with higher priority, on the basis of the type of terminal apparatus indicated by the read terminal information, communication volumes corresponding to resources allocated to respective terminal apparatuses that have already started communication, and an un-used communication volume of a predetermined maximum communication volume that is permitted for allocation by the first base-station apparatus 20. The maximum communication volume may be the largest communication volume that can be realized by the communicator 22 as its function and is the largest communication volume that is permitted to be used for communication. In general, the latter communication volume is smaller than the former communication volume.

When the un-used communication volume that can be allocated by the first base-station apparatus 20 is larger than the communication volume used for communication with the terminal apparatus 10 that is the transmission source of new communication-start request information (this terminal apparatus 10 is hereinafter referred to as a "communication-start request terminal"), the communication-status determining unit 216 determines that the communication with the communication-start request terminal is to be started. The communication-status determining unit 216 pre-stores, for example, the communication volumes for respective models and determination data indicating priorities among the models. By referring to the determination data, the communication-status determining unit 216 can determine a communication volume and a priority corresponding to a model indicated by each piece of terminal information. The controller 21 allocates resources used for communication with the terminal apparatus 10 which is to be started and transmits communication-start notification information including resource information indicating the allocated resources.

When the un-used communication volume becomes smaller than or equal to the communication volume used for communication with the communication-start request terminal, the communication-status determining unit 216 determines, of the communication-start request terminal and a terminal apparatus that is communicating, a terminal apparatus that performs communication with the first base-station apparatus 20 with higher priority so that a total of the communication volume used for the communication with the communication-start request terminal and the communication volume used for communication with the communicating terminal apparatus does not exceed the maximum communication volume. The communication-status determining unit 216 determines that communication with the terminal apparatus having a higher priority is to be maintained or started with higher priority. With respect to the terminal apparatus having a lower priority, the communication-status determining unit 216 determines that communication with a base-station apparatus (e.g., the second base-station apparatus 30) that is different from the first base-station apparatus 20 that is the serving base-station apparatus is to be performed with higher priority. The controller 21 transmits, to the terminal apparatus 10, communication instruction information (a switching instruction; redirection) indicating communication with the different base-station apparatus determined by the communication-status determining unit 216.

The communication-status determining unit 216 may store switching communication information indicating a terminal apparatus to which the communication instruction information is transmitted (i.e., a terminal apparatus related to communication for which the switching is to be performed), a base-station apparatus indicated by the communication instruction information (i.e., a base-station apparatus that is a switching destination), and a terminal apparatus that performs communication with higher priority (i.e., a terminal apparatus related to communication that became a cause for the switching). By referring to the switching communication information, the communication-status determining unit 216 can identify a terminal apparatus related to the communication for which the switching is to be performed and the base-station apparatus that is the switching destination.

There are cases in which, after the communication instruction information is transmitted, the un-used communication volume becomes larger than the communication volume used for communication with the communication-start request terminal related to the communication for which the switching was performed. In such cases, for example, there are cases in which communication that became a cause for the switching ends, and resources used for the communication are released. In such cases, with respect to the communication for which the switching was performed, the communication-status determining unit 216 transmits, to the switching-destination base-station apparatus through a core network (not illustrated), callback instruction information indicating callback to the first base-station apparatus 20. The plurality of base-station apparatuses included in the communication system 1 is connected to the core network. The communication-status determining unit 216 may delete the switching communication information related to the transmitted callback instruction information.

The communication-status determining unit 216 determines that a terminal apparatus whose priority determined by referring to the determination data is higher performs communication with higher priority. Priorities may be included in the determination data in accordance with any of conditions described below by way of example or a combination of the conditions.

(1) Higher priority is given to the terminal apparatus 10 whose model uses a larger communication volume during operation. This is because the communication volume used for communication with the terminal apparatus 10 whose model uses a larger communication volume is not satisfied with only the un-used communication volume in another base-station apparatus, and thus switching of the base-station apparatus is highly likely to fail. For example, the priority of a model, such as an ultra-high-definition television, that continuously receives a large amount of broadcast data may be increased relative to the priority of a model, such as air-conditioning equipment, a refrigerator, or a cooking appliance, that transmits a relatively small amount of sensor information.

(2) The priority of a terminal apparatus 10 that is a model for stationary use is increased relative to the priority of a terminal apparatus 10 that is a model intended for movement in normal use.

This is because models for stationary use have constraints in the mobility and are thus less likely to be used in the coverage range of another base-station apparatus. This is because, even if a model for stationary model is installed at a position located in the coverage range of another base-station apparatus, the communication volume that can be provided by the other base-station apparatus is occupied by other communication, and thus there is a possibility that switching of the base-station apparatus fails. For example, the priority of an ultra-high-definition television that is stationary may be increased relative to the priority of an information terminal apparatus, such as a mobile phone, that is intended for movement.

(3) The priority of a terminal apparatus that is able to connect to a local base-station apparatus and that is not able to connect to a base-station apparatus other than the local base-station apparatus (such a terminal apparatus is hereinafter referred to as a "local-apparatus-dedicated terminal") is increased relative to the priority of a terminal apparatus that is also able to connect to a base-station apparatus other than the local base-station apparatus.

One example of a case in which a terminal apparatus is able to connect to only a local base-station apparatus is a case in which a terminal apparatus is able to perform connection using a first wireless communication system (e.g., LTE) that can be used by a local base-station apparatus and is not able to perform connection by using a second wireless communication system (e.g., the Institute Electrical and Electronics Engineers (IEEE) 802.11) that is not used by another base-station apparatus in the vicinity of the local base-station apparatus. Another example is a case in which a communication service provider for a network including a local base-station apparatus and a user of the terminal apparatus 10 have made a service contract, but a communication service provider for a network including another base-station apparatus and the user of the terminal apparatus 10 have not made a service contract. For example, the priority of a television that is able to perform connection by using only the second wireless communication system may be increased relative to the priority of a mobile phone that is able to perform connection by using any of the first wireless communication system and the second wireless communication system.

The terminal information indicating a local-apparatus-dedicated terminal may be pre-set in the determination data. With respect to models whose priorities are equivalent to each other, the communication-status determining unit 216 may increase the priority of the model that receives communication-start request information earlier than the other model.

On the basis of a measurement report received from a communication-start request terminal, the communication-status determining unit 216 can designate another base-station apparatus that is a switching destination. The measurement report indicates the reception qualities (e.g., the reception levels) of reference signals transmitted from cells of the first base-station apparatus 20 and other base-station apparatuses installed geographically in a predetermined range from the first base-station apparatus 20. For example, the communication-status determining unit 216 designates, as a switching-destination base-station apparatus, the base-station apparatus that is included in the base-station apparatuses from which reference signals whose reception qualities exceed a predetermined reception-quality threshold are transmitted, that is related to the cell from which the reference signal whose reception quality is the highest is transmitted, and that is not the first base-station apparatus 20. The reception-quality threshold may be a threshold for determining whether or not the communication-start request terminal is located in the coverage range of the serving base-station apparatus. In order to obtain the measurement report, the controller 21 transmits measurement setting information indicating the reference signals to be measured for the respective cells of the base-station apparatuses. The terminal apparatus 10 measures the reception qualities with respect to the reference signals indicated by the measurement setting information received from the first base-station apparatus 20.

The communicator 22 performs communication with the terminal apparatus 10 that is located in the coverage range of the first base-station apparatus 20 in accordance with the predetermined wireless communication system. The communicator 22 may be configured, for example, as a wireless communication interface. The communicator 22 includes a first communicator 22a and a second communicator 22b. The first communicator 22a and the second communicator 22b perform communication with the terminal apparatus 10 in the coverage range by using a first wireless communication system and a second wireless communication system, respectively.

The first communicator 22a includes a first receiving unit 221 and a first transmitting unit 222. The second communicator 22b includes a second receiving unit 223 and a second transmitting unit 224.

Each of the first receiving unit 221 and the second receiving unit 223 outputs, to the controller 21, reception signals received as radio waves from the terminal apparatus 10 by using a corresponding antenna.

Each of the first transmitting unit 222 and the second transmitting unit 224 supplies transmission signals, input from the controller 21, to a corresponding antenna to transmit the transmission signals to the base-station apparatus as radio waves.

Figure 6:
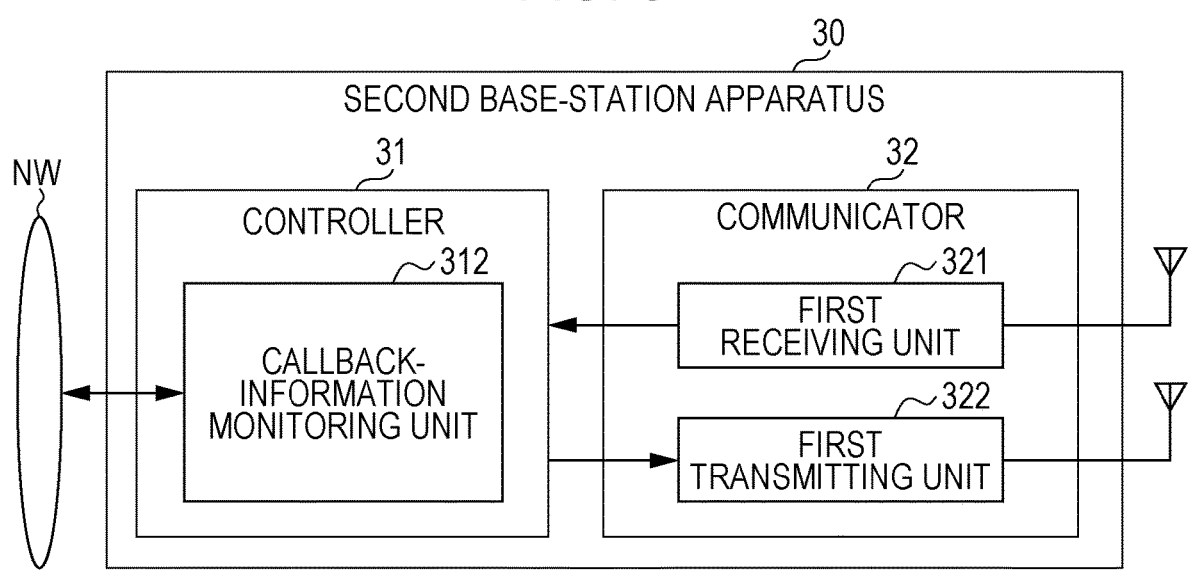
FIG. 6 is a schematic block diagram illustrating a configuration example of a second base-station apparatus according to the first embodiment.

FIG. 6 is a schematic block diagram illustrating a configuration example of the second base-station apparatus 30 according to the present embodiment.

The second base-station apparatus 30 includes a controller 31 and a communicator 32.

The controller 31 controls various functions of the second base-station apparatus 30. The controller 31 includes, for example, one or more processors and a storage medium. Each processor may realize functions of the individual units described below, by reading a program pre-stored in the storage medium and performing processing indicated by an instruction written in the read program.

The controller 31 includes a callback-information monitoring unit 312.

The callback-information monitoring unit 312 waits for receiving callback instruction information through the core network. The callback-information monitoring unit 312 identifies the terminal apparatus 10 related to the callback instruction information among the terminal apparatuses 10 that are communicating with the second base-station apparatus 30 and transmits, to the identified terminal apparatus 10, switching instruction information indicating switching to a base-station apparatus (e.g., the first base-station apparatus 20) that is the transmission source of the callback instruction information and that is a callback destination (redirection).

Upon receiving the switching instruction information from the second base-station apparatus 30, the controller 11 in the terminal apparatus 10 performs connection processing with the base-station apparatus that is the callback destination (e.g., the first base-station apparatus 20). After completing the connection processing, the controller 11 in the terminal apparatus 10 transmits connection completion information indicating that the connection is completed to the second base-station apparatus 30. Upon receiving the connection completion information from the terminal apparatus 10, the controller 31 in the second base-station apparatus 30 releases resources allocated to the terminal apparatus 10 and breaks the connection with the terminal apparatus 10.

The controller 31 also performs processing regarding communication based on the predetermined wireless communication system. Since details of the processing are similar to the processing in the controller 21 in the first base-station apparatus 20, the descriptions thereof are not given hereinafter.

The communicator 32 performs communication with the terminal apparatus 10 in the coverage range of the second base-station apparatus 30 in accordance with the predetermined wireless communication system. The communicator 32 may be configured, for example, a wireless communication interface. The communicator 32 includes a first receiving unit 321 and a first transmitting unit 322. Since the configuration of the first receiving unit 321 and the configuration of the first transmitting unit 322 are respectively the same as or similar to the configuration of the first receiving unit 221 and the configuration of the first transmitting unit 222 in the first base-station apparatus 20, descriptions thereof are not given hereinafter.

(Communication Processing)

Next, a description will be given of one example of communication processing according to the present embodiment.

Figure 7:
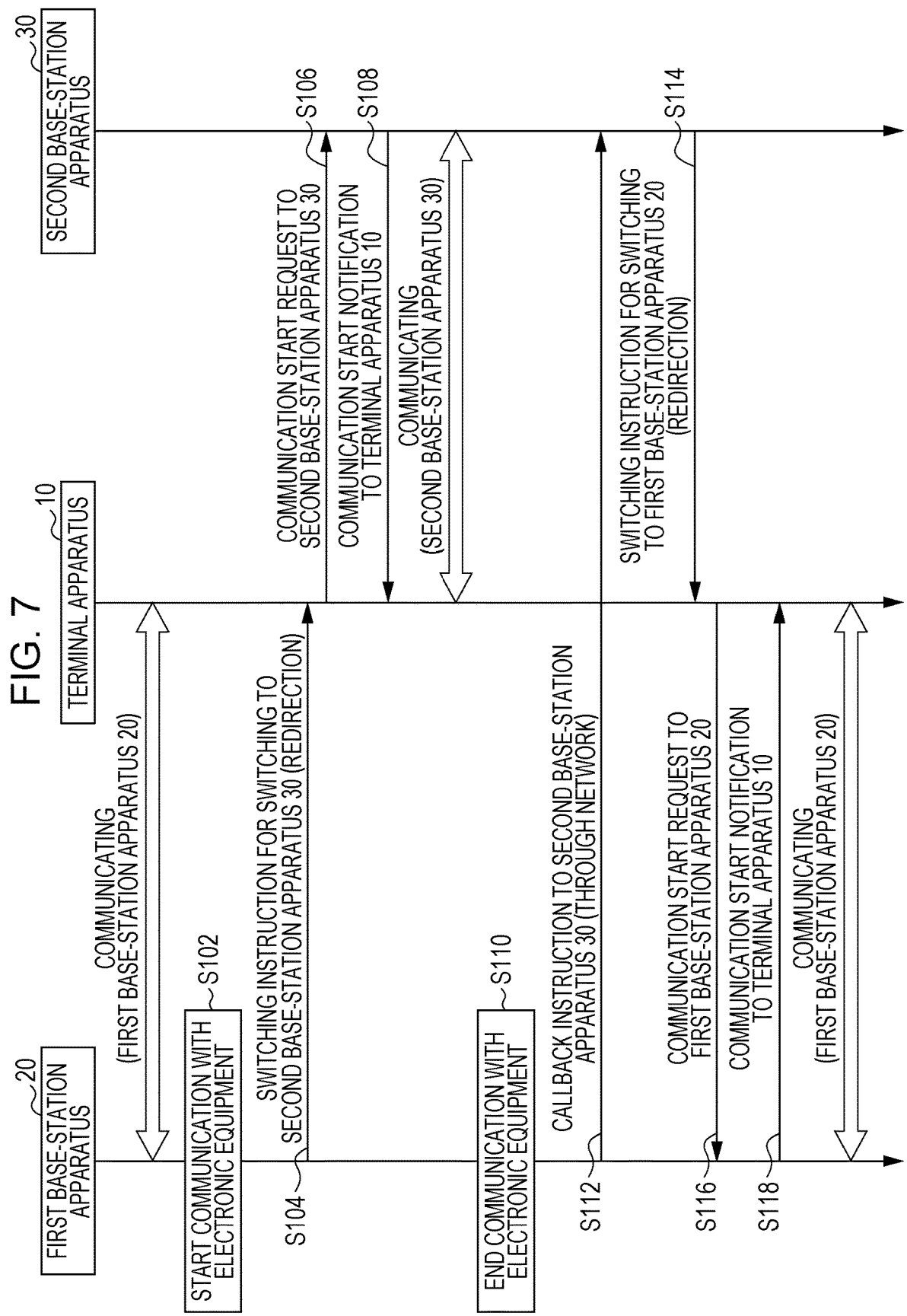
FIG. 7 is a sequence diagram illustrating one example of communication processing according to the first embodiment.

FIG. 7 is a sequence diagram illustrating one example of communication processing according to the present embodiment.

The example illustrated in FIG. 7 corresponds to a case in which the communication processing is started when the terminal apparatus 10 is communicating with the first base-station apparatus 20, which is a mobile phone, and the electronic equipment 40, which is an ultra-high-definition television, is not operating. In this example, it is assumed that the un-used communication volume in the first base-station apparatus 20 becomes smaller than or equal to the communication volume used for communication with the electronic equipment 40, and the total of the communication volume of communication with the terminal apparatus 10 and the un-used communication volume becomes larger than the communication volume used for the communication with the electronic equipment 40.

In step S102, in response to an operation start instruction according to a user's operation, the electronic equipment 40 starts communication with the first base-station apparatus 20. The electronic equipment 40 transmits communication-start request information including the terminal information of the electronic equipment 40 to the first base-station apparatus 20. The connection-terminal storage unit 214 in the first base-station apparatus 20 retrieves the terminal information from the communication-start request information received from the electronic equipment 40 and stores the retrieved terminal information.

In step S104, the communication-status determining unit 216 in the first base-station apparatus 20 identifies the model of the terminal apparatus 10 and the model of the electronic equipment 40 and determines an un-used communication volume on the basis of the communication volume of communication with the terminal apparatus 10 and the maximum communication volume. The communication-status determining unit 216 determines a communication volume used for the communication with the electronic equipment 40, and since the determined communication volume is larger than the un-used communication volume, the communication-status determining unit 216 determines that the communication with the electronic equipment 40 is given priority relative to the communication with the terminal apparatus 10.

On the basis of a measurement report from the terminal apparatus 10, the communication-status determining unit 216 designates the second base-station apparatus 30 as another base-station apparatus having a coverage range in which the terminal apparatus 10 is located. The controller 21 transmits communication instruction information indicating switching to the second base-station apparatus 30 to the terminal apparatus 10 (redirection).

In step S106, when the communication-enabling permission obtaining unit 112 in the terminal apparatus 10 receives the communication instruction information from the first base-station apparatus 20, the communication connection switching unit 114 transmits communication-start request information to the second base-station apparatus 30 indicated by the communication instruction information.

In step S108, upon receiving the communication-start notification information received from the terminal apparatus 10, the controller 31 in the second base-station apparatus 30 transmits communication-start notification information to the terminal apparatus 10. Upon receiving the communication-start notification information from the second base-station apparatus 30, the controller 11 in the terminal apparatus 10 starts communication with the second base-station apparatus 30.

The controller 21 in the first base-station apparatus 20 breaks the connection with the terminal apparatus 10 and releases resources allocated to the terminal apparatus 10. Thus, the communication between the terminal apparatus 10 and the first base-station apparatus 20 ends.

Thereafter, the controller 21 in the first base-station apparatus 20 performs connection processing with the electronic equipment 40 to start communication with the electronic equipment 40. During the communication with the electronic equipment 40, for example, the controller 21 relays broadcast-data requesting information from the electronic equipment 40 to a content server apparatus of a certain broadcast business operator and then transmits broadcast data, received from the content server, to the electronic equipment 40.

In step S110, in response to an operation end instruction according to the user's operation, the electronic equipment 40 ends receiving reception signals from the first base-station apparatus 20 (that is, ends the communication). The electronic equipment 40 transmits communication-end request information to the first base-station apparatus 20. Upon receiving the communication-end request information from the electronic equipment 40, the controller 21 in the first base-station apparatus 20 releases resources allocated to the communication with the electronic equipment 40 and breaks the connection with the electronic equipment 40. The controller 21 also deletes the terminal information of the electronic equipment 40, the terminal information being stored in the connection-terminal storage unit 214.

In step S112, by referring to terminal information stored in the connection-terminal storage unit 214, the communication-status determining unit 216 in the first base-station apparatus 20 determines that the communication with the electronic equipment 40 is ended and determines an un-used communication volume. The un-used communication volume increases by an amount of change corresponding to a communication volume according to resources released after the communication with the electronic equipment 40 is ended. The communication-status determining unit 216 determines that the un-used communication volume at this point in time is larger than the communication volume used for the communication with the terminal apparatus 10 to which the base-station-apparatus switching instruction was issued in step S104. Also, by referring to the stored switching communication information, the communication-status determining unit 216 identifies the terminal apparatus 10 related to the communication for which the switching was performed and the second base-station apparatus 30 that is the switching destination. The controller 21 then transmits, to the second base-station apparatus 30 through the core network, callback instruction information indicating callback to the first base-station apparatus 20 with respect to the communication with the terminal apparatus 10.

In step S114, upon receiving the callback instruction information from the first base-station apparatus 20, the callback-information monitoring unit 312 in the second base-station apparatus 30 identifies the communication with the terminal apparatus 10 that is included in terminal apparatuses that are communicating therewith and that is indicated by the callback instruction information and the first base-station apparatus 20 that is a callback destination. The callback-information monitoring unit 312 transmits, to the terminal apparatus 10, switching instruction information indicating switching to the first base-station apparatus 20 (redirection).

In step S116, when the communication-enabling permission obtaining unit 112 in the terminal apparatus 10 receives the switching instruction information from the second base-station apparatus 30, the communication connection switching unit 114 switches the serving base-station apparatus from the second base-station apparatus 30 to the first base-station apparatus 20. For the switching, the communication connection switching unit 114 transmits communication-start request information to the first base-station apparatus 20.

In step S118, the controller 21 in the first base-station apparatus 20 stores the terminal information, included in the communication-start request information received from the terminal apparatus 10, in the connection-terminal storage unit 214. The communication-status determining unit 216 determines that communication with the terminal apparatus 10 is to be started. The controller 21 performs connection processing with the terminal apparatus 10 to establish a connection therewith. The communication-status determining unit 216 allocates resources used for the communication with the terminal apparatus 10 and transmits communication-start notification information, together with resource information indicating the allocated resources, to the terminal apparatus 10. Thereafter, the controller 11 in the terminal apparatus 10 can start the communication with the first base-station apparatus 20 by using the resources indicated by the resource information included in the communication-start notification information received from the first base-station apparatus 20. Thereafter, the processing illustrated in FIG. 7 ends.

Figure 8:
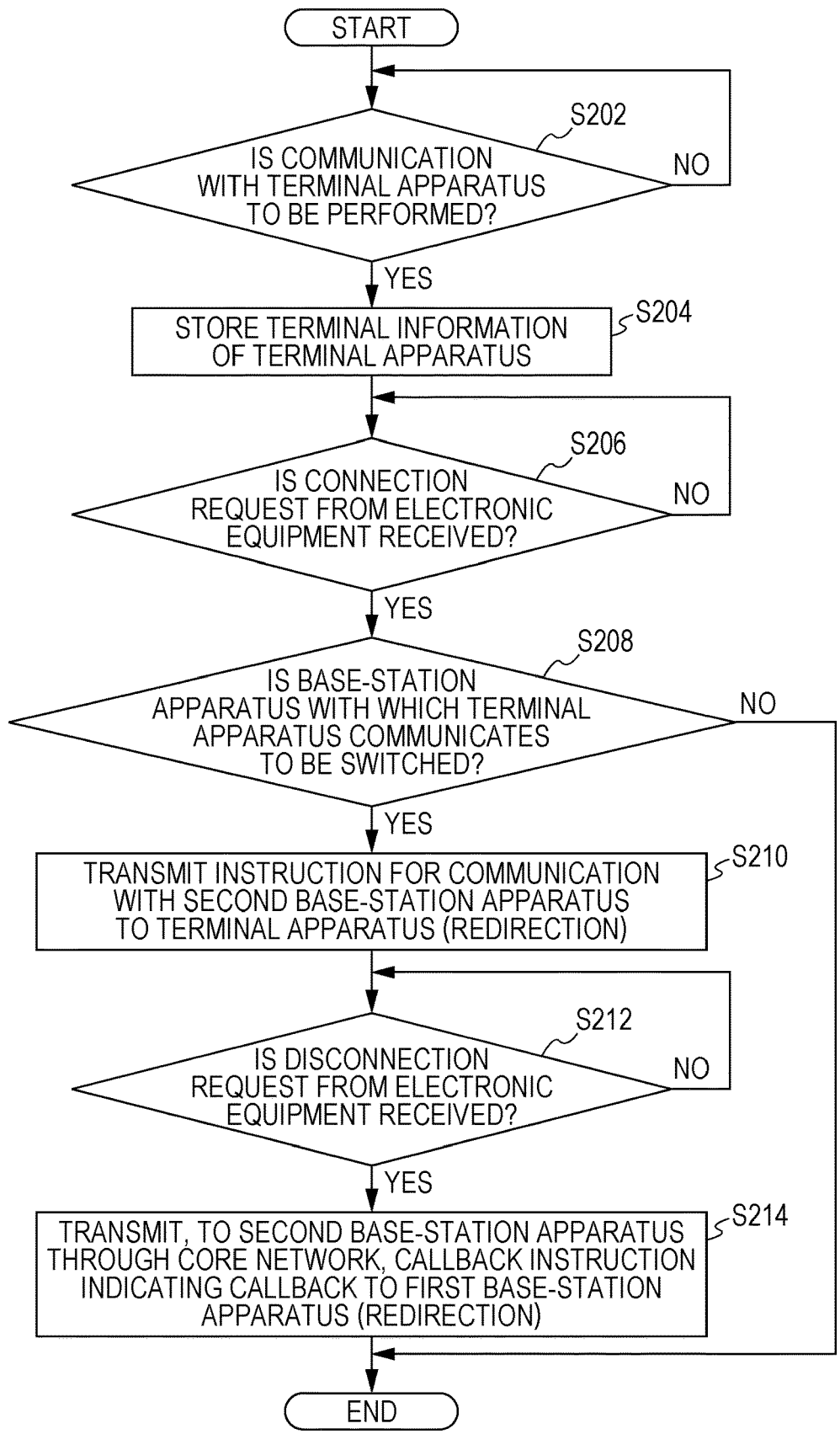
FIG. 8 is a flowchart illustrating a processing example of the first base-station apparatus according to the first embodiment.

Next, a description will be given of a processing example in the first base-station apparatus 20, the second base-station apparatus 30, and the terminal apparatus 10 according to the present embodiment. The processing example described below corresponds to the operations of the apparatuses in the processing illustrated in FIG. 7. FIG. 8 is a flowchart illustrating a processing example of the first base-station apparatus 20 according to the present embodiment. In step S202, the controller 21 waits for receiving communication-start request information from the terminal apparatus 10 and determines whether or not communication with the terminal apparatus 10 is to be performed. When the controller 21 determines that the communication is to be performed (YES in step S202), the flow proceeds to a process in step S204. Upon determining that the communication is not to be performed (NO in step S202), the controller 21 repeats the process in step S202. In step S204, the communication-status determining unit 216 stores the terminal information of the terminal apparatus 10 in the connection-terminal storage unit 214. Thereafter, the flow proceeds to a process in step S206.

In step S206, the controller 21 waits for receiving communication-start request information (a connection request) from the electronic equipment 40, and when the controller 21 receives the communication-start request information (YES in step S206), the flow proceeds to a process in step S208. When the controller 21 does not receive the communication-start request information (NO in step S206), it repeats the process in step S206.

In step S208, the communication-status determining unit 216 identifies the model of the terminal apparatus 10 and the model of the electronic equipment 40 and determines an un-used communication volume on the basis of the communication volume of communication with the terminal apparatus 10 and the maximum communication volume. By comparing the communication volume used for communication with the electronic equipment 40 with the un-used communication volume, the communication-status determining unit 216 determines whether or not the base-station apparatus with which the terminal apparatus 10 communicates is to be switched by giving higher priority to the communication with the electronic equipment 40 than to the communication with the terminal apparatus 10. When the communication-status determining unit 216 determines that the base-station apparatus is to be switched (YES in step S208), the flow proceeds to a process in step S210, and when the communication-status determining unit 216 determines that the base-station apparatus is not to be switched (NO in step S208), the communication with the terminal apparatus 10 is continued, and the processing illustrated in FIG. 8 ends.

In step S210, on the basis of a measurement report from the terminal apparatus 10, the communication-status determining unit 216 designates the second base-station apparatus 30 as another base-station apparatus having a coverage range in which the terminal apparatus 10 is located. The controller 21 transmits communication instruction information indicating switching to the second base-station apparatus 30 to the terminal apparatus 10 (redirection). Thereafter, the flow proceeds to a process in step S212.

In step S212, the controller 21 waits for receiving communication-end request information (a disconnection request) from the electronic equipment 40, and when the controller 21 receives the communication-end request information (YES in step S212), the flow proceeds to a process in step S214. When the controller 21 does not receive the communication-end request information (NO in step S212), it repeats the process in step S212.

In step S214, the controller 21 releases the resources allocated to the communication with the electronic equipment 40, breaks the connection with the electronic equipment 40, and deletes the terminal information of the electronic equipment 40, the terminal information being stored in the connection-terminal storage unit 214. By referring to terminal information stored in the connection-terminal storage unit 214, the communication-status determining unit 216 determines that the communication with the electronic equipment 40 is ended and determines an un-used communication volume. By referring to the stored switching communication information, the communication-status determining unit 216 identifies the terminal apparatus 10 related to the communication for which the switching was performed and the second base-station apparatus 30 that is the switching destination. The controller 21 then transmits, to the second base-station apparatus 30 through the core network, callback instruction information indicating callback to the first base-station apparatus 20 with respect to the communication with the terminal apparatus 10. Thereafter, the processing illustrated in FIG. 8 ends.

Figure 9:
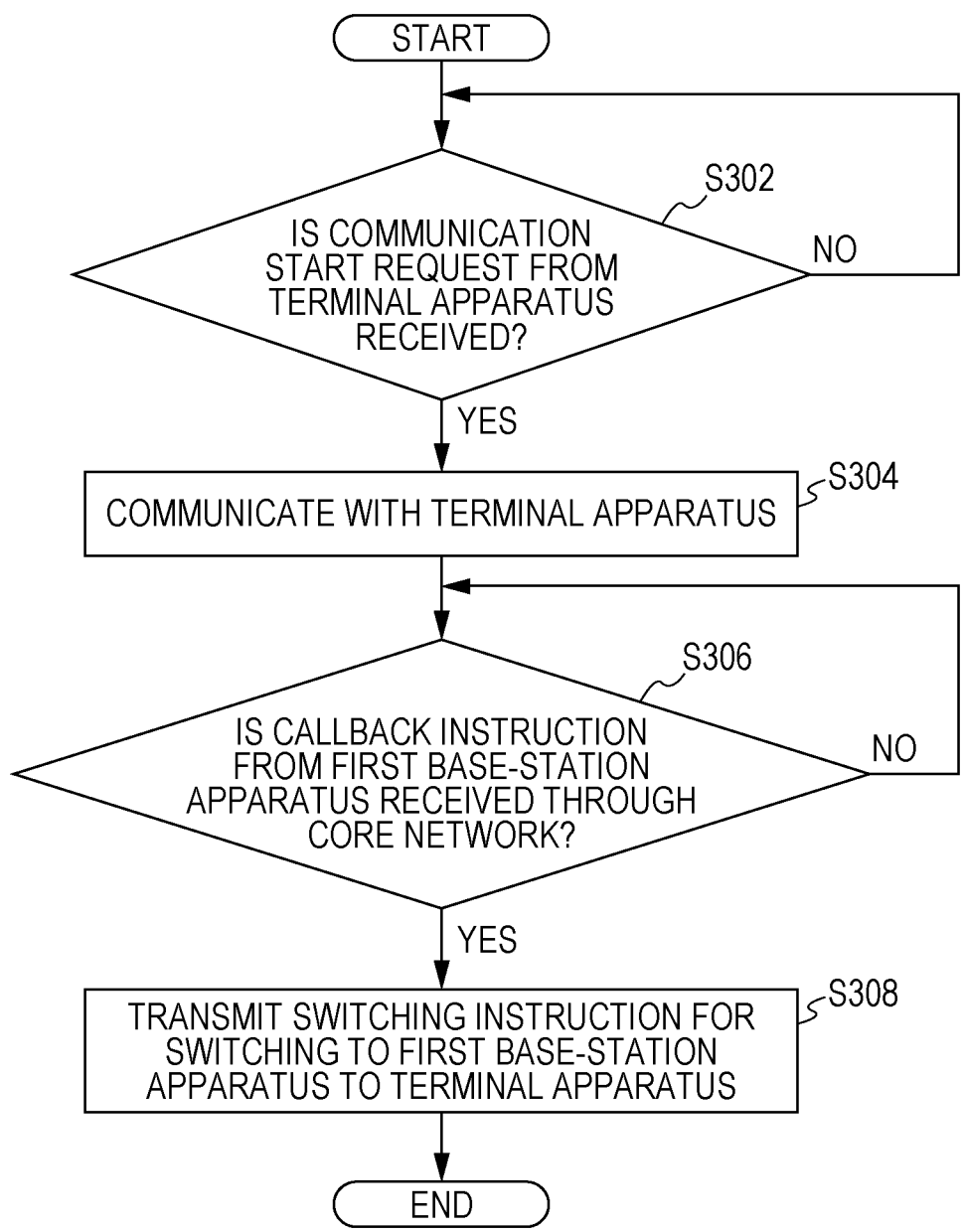
FIG. 9 is a flowchart illustrating a processing example of the second base-station apparatus according to the first embodiment.

FIG. 9 is a flowchart illustrating a processing example of the second base-station apparatus 30 according to the present embodiment. In step S302, the controller 31 waits for receiving communication-start request information from the terminal apparatus 10 and determines whether or not communication with the terminal apparatus 10 is to be performed. When the controller 31 determines that the communication is to be performed (YES in step S302), the flow proceeds to a process in step S304. When the controller 31 determines that the communication is not to be performed (NO in step S302), it repeats the process in step S302. In step S304, the controller 31 transmits communication-start notification information to the terminal apparatus 10 and then starts the communication with the terminal apparatus 10. Thereafter, the flow proceeds to a process in step S306.

In step S306, the callback-information monitoring unit 312 waits for receiving callback instruction information from the first base-station apparatus 20 and determines whether or not the callback instruction information is received. When the callback-information monitoring unit 312 receives the callback instruction information (YES in step S306), the flow proceeds to a process in step S308. When the callback-information monitoring unit 312 does not receive the callback instruction information (NO in step S306), it repeats the process in step S306.

In step S308, the callback-information monitoring unit 312 transmits, to the terminal apparatus 10 indicated by the callback instruction information, switching instruction information indicating switching to the first base-station apparatus 20 as a callback destination. Thereafter, the processing illustrated in FIG. 9 ends.

Figure 10:
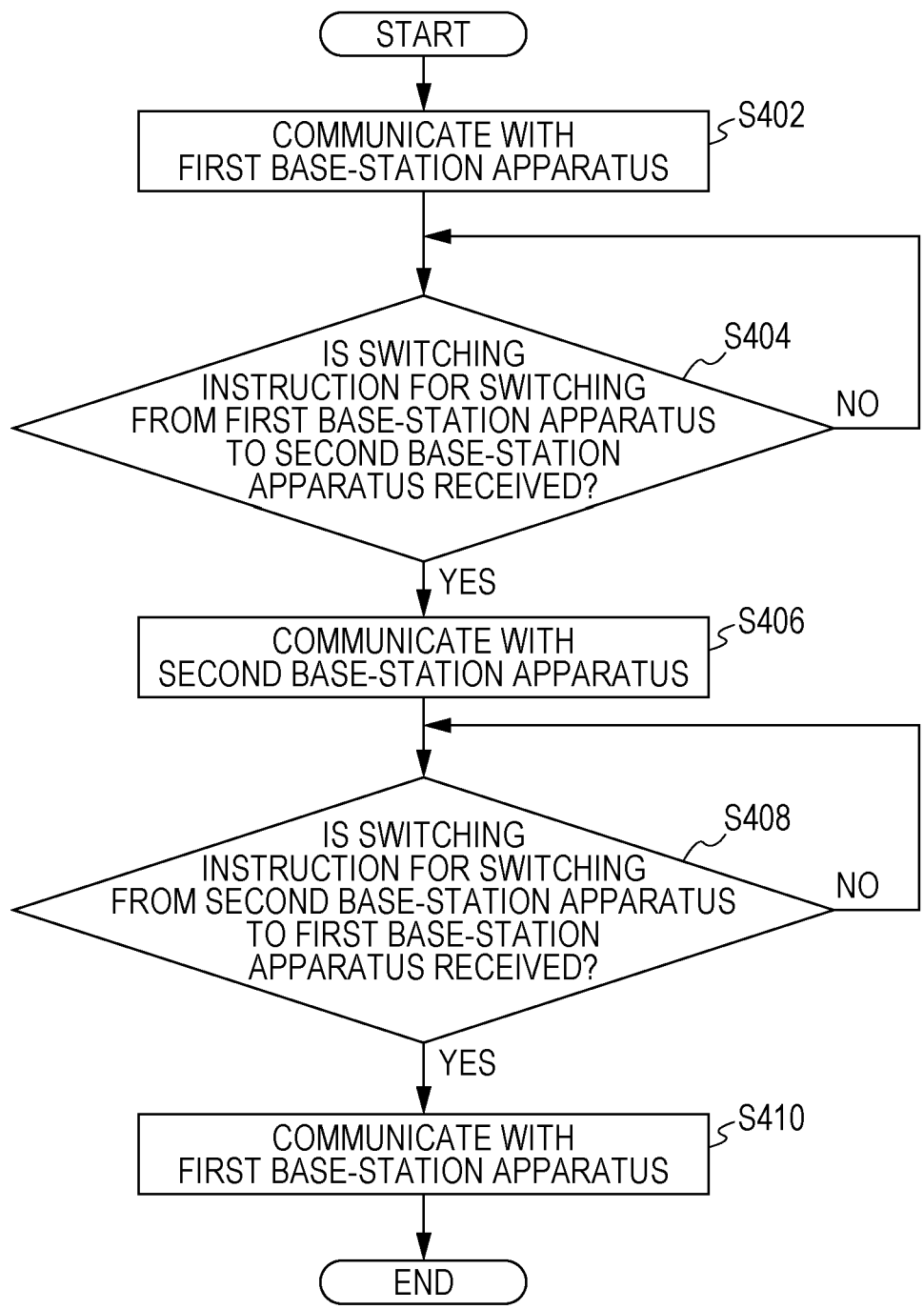
FIG. 10 is a flowchart illustrating a processing example of the terminal apparatus according to the first embodiment.

FIG. 10 is a flowchart illustrating a processing example of the terminal apparatus 10 according to the present embodiment.

In step S402, in response to a communication start instruction, the controller 11 transmits communication-start request information to the first base-station apparatus 20 having a coverage range in which the terminal apparatus 10 is located. The controller 11 starts communication with the first base-station apparatus 20 by using resources indicated by the resource information included in communication-start notification information received from the first base-station apparatus 20. Thereafter, the flow proceeds to a process in step S404.

In step S404, the communication-enabling permission obtaining unit 112 waits for receiving communication instruction information (a switching instruction) from the first base-station apparatus 20 and determines whether or not the communication instruction information is received. When the communication-enabling permission obtaining unit 112 receives the communication instruction information (YES in step S404), the flow proceeds to a process in step S406. When the communication-enabling permission obtaining unit 112 does not receive the communication instruction information (NO in step S404), it repeats the process in step S404.

In step S406, the communication connection switching unit 114 switches the serving base-station apparatus from the first base-station apparatus 20 to the second base-station apparatus 30 indicated by the communication instruction information received by the communication-enabling permission obtaining unit 112. The controller 11 starts communication with the second base-station apparatus 30.

Thereafter, the flow proceeds to a process in step S408.

In step S408, the communication-enabling permission obtaining unit 112 waits for receiving communication instruction information (a switching instruction) from the second base-station apparatus 30 and determines whether or not the communication instruction information is received. When the communication-enabling permission obtaining unit 112 receives the communication instruction information (YES in step S408), the flow proceeds to a process in step S410. When the communication-enabling permission obtaining unit 112 does not receive the communication instruction information (NO in step S408), it repeats the process in step S408.

In step S410, the communication connection switching unit 114 switches the serving base-station apparatus from the second base-station apparatus 30 to the first base-station apparatus 20 indicated by the communication instruction information received by the communication-enabling permission obtaining unit 112. At this point in time, the controller 11 transmits communication-end request information to the second base-station apparatus 30, and upon receiving communication-end notification information as a response to the communication-end request information, the controller 11 ends communication of user data with the second base-station apparatus 30. Thereafter, the controller 11 transmits communication-start request information to the first base-station apparatus 20, and upon receiving communication-start notification information as a response to the communication-start request information, the controller 11 starts communication with the first base-station apparatus 20 by using resources indicated by the resource information included in the communication-start notification information. Thereafter, the processing illustrated in FIG. 10 ends.

Second Embodiment

Next, a description will be given of a second embodiment of the present disclosure. Processes and configurations that are the same as or similar to those described above are denoted by the same reference numerals, and descriptions thereof are not given hereinafter, unless otherwise particularly stated.

First, a description will be given of a brief overview of the present embodiment. A terminal apparatus 10 has a function for simultaneously establishing a plurality of communication connections belonging to different networks. In the example illustrated in FIG. 11, in a communication system 2 according to the present embodiment, the terminal apparatus 10, which is a mobile phone, establishes a communication connection I with a first base-station apparatus 20 to perform communication through transmission/reception of various types of user data and also establishes a communication connection III with a second base-station apparatus 30 but does not transmit/receive user data. The first base-station apparatus 20 is a base-station apparatus (e.g., a wireless router) that provides a wireless communication service by using, for example, an on-premises wireless communication system (e.g., IEEE 802.11). The second base-station apparatus 30 is a base-station apparatus that provides a wireless communication service by using, for example, a public wireless communication system (e.g., 5G, LTE, or W-CDMA®). The terminal apparatus 10 has access to both the first base-station apparatus 20 and the second base-station apparatus 30 that construct networks that are different from each other. The network to which the first base-station apparatus 20 belongs and the network to which the second base-station apparatus 30 belongs may be referred to as a "first network" and a "second network", respectively. It is assumed that, at this point in time, electronic equipment 40, which is an ultra-high-definition television, communicates with neither the first base-station apparatus 20 nor the second base-station apparatus 30.

Figure 12:
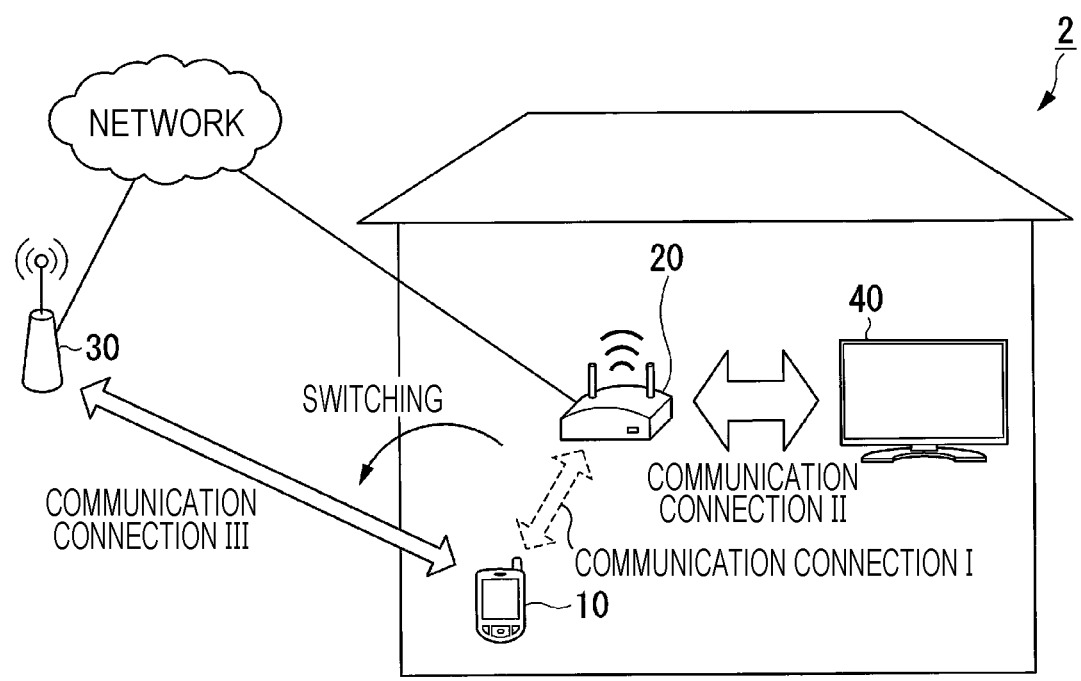
FIG. 12 is a conceptual diagram illustrating a second case in the communication system according to the second embodiment.

Thereafter, when the first base-station apparatus 20 establishes a communication connection II with the electronic equipment 40, the first base-station apparatus 20 transmits communication instruction information indicating switching the serving base-station apparatus to the second base-station apparatus 30 to the terminal apparatus 10 that is to be enabled to communicate with the second base-station apparatus 30 ("switching" in FIG. 12) and stores switching communication information regarding the terminal apparatus 10 to which the communication instruction information is transmitted. At this stage, the electronic equipment 40 performs communication by using the first network via the first base-station apparatus 20, whereas the terminal apparatus 10 performs communication by using the second network via the second base-station apparatus 30.

Figure 13:
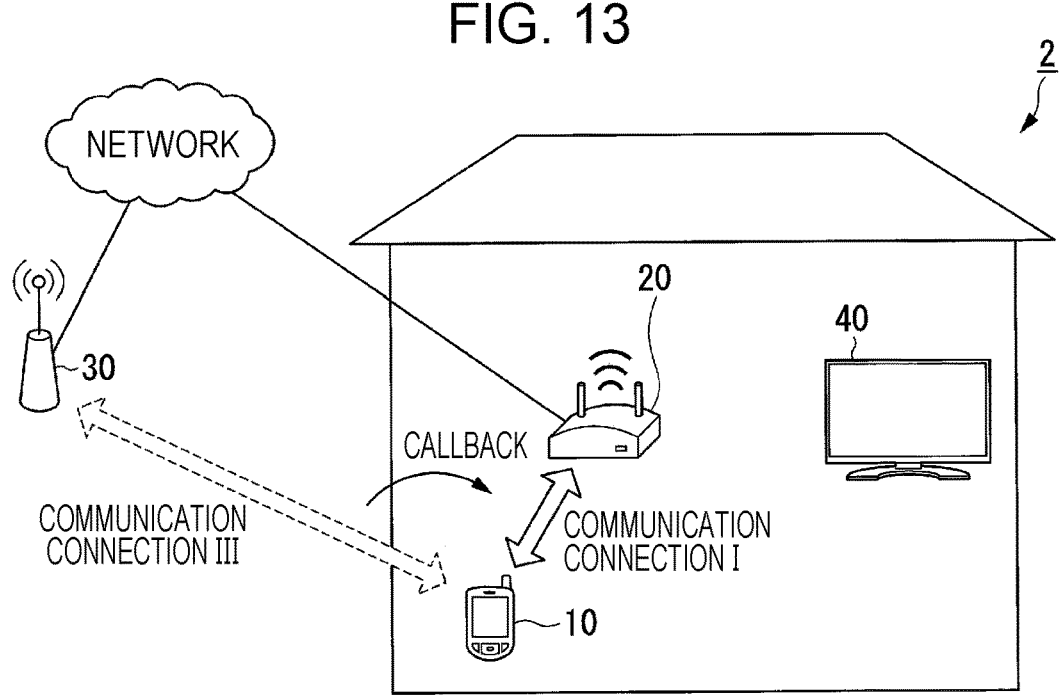
FIG. 13 is a conceptual diagram illustrating a third case in the communication system according to the second embodiment.

When the electronic equipment 40 ends receiving broadcast data via the first base-station apparatus 20 (a power supply is turned off), the first base-station apparatus 20 transmits, to the terminal apparatus 10, a callback instruction indicating callback of the serving base-station apparatus from the second base-station apparatus 30 to the first base-station apparatus 20 ("callback" in FIG. 13). The terminal apparatus 10 ends the communication with the second base-station apparatus 30 and resumes the communication with the first base-station apparatus 20. Therefore, according to the present embodiment, it is possible to switch the serving base-station apparatus between the different networks while maintaining the communication connection III with the terminal apparatus 10 for which the switching is performed. Thus, the terminal apparatus 10 can receive paging information (an incoming call) by using the network connected before the switching and can immediately resume the communication without performing connection processing from the beginning during callback.

(Terminal Apparatus)

Next, a description will be given of a configuration example of the terminal apparatus 10 according to the present embodiment.

Figure 14:
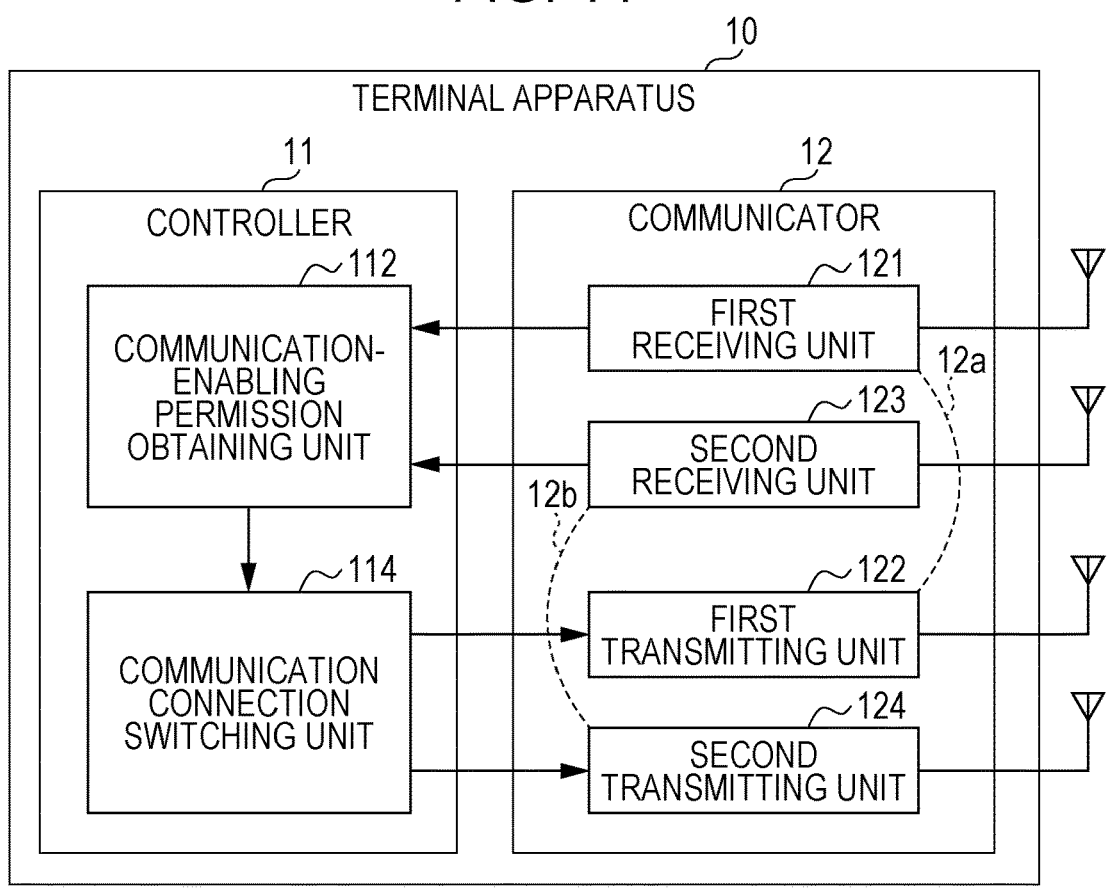
FIG. 14 is a schematic block diagram illustrating a configuration example of a terminal apparatus according to the second embodiment.

FIG. 14 is a schematic block diagram illustrating a configuration example of the terminal apparatus 10 according to the present embodiment.

The terminal apparatus 10 includes a controller 11 and a communicator 12.

The controller 11 includes a communication-enabling permission obtaining unit 112 and a communication connection switching unit 114.

Even if the communication connection switching unit 114 switches the serving base-station apparatus on the basis of the communication instruction information, the controller 11 does not break a connection with a base-station apparatus used before the switching and maintains the connection. Also, even when the communication connection switching unit 114 switches the serving base-station apparatus to the pre-switching base-station apparatus on the basis of the callback instruction information, the controller 11 may maintain a connection with a base-station apparatus used before the switching-back, without breaking the connection therewith. The controller 11 breaks the connection when communication between the terminal apparatus 10 and an apparatus at another end of the communication ends. When any connection related to the terminal apparatus 10 is still maintained at this point in time, the controller 11 also breaks the connection.

The communicator 12 includes a first communicator 12a and a second communicator 12b. By using a predetermined first wireless communication system, the first communicator 12a communicates with a base-station apparatus belonging to the first network. The first communicator 12a includes a first receiving unit 121 and a first transmitting unit 122. By using a predetermined second wireless communication system, the second communicator 12b communicates with a base-station apparatus belonging to the second network. The second communicator 12b includes a second receiving unit 123 and a second transmitting unit 124. Similarly to the first receiving unit 121 described above, the second receiving unit 123 receives reception signals wirelessly transmitted from a base-station apparatus, and similarly to the first transmitting unit 122 described above, the second transmitting unit 124 wirelessly transmits transmission signals to a base-station apparatus.

(Base-Station Apparatus)

Next, a description will be given of configuration examples of the base-station apparatuses according to the present embodiment.

Figure 15:
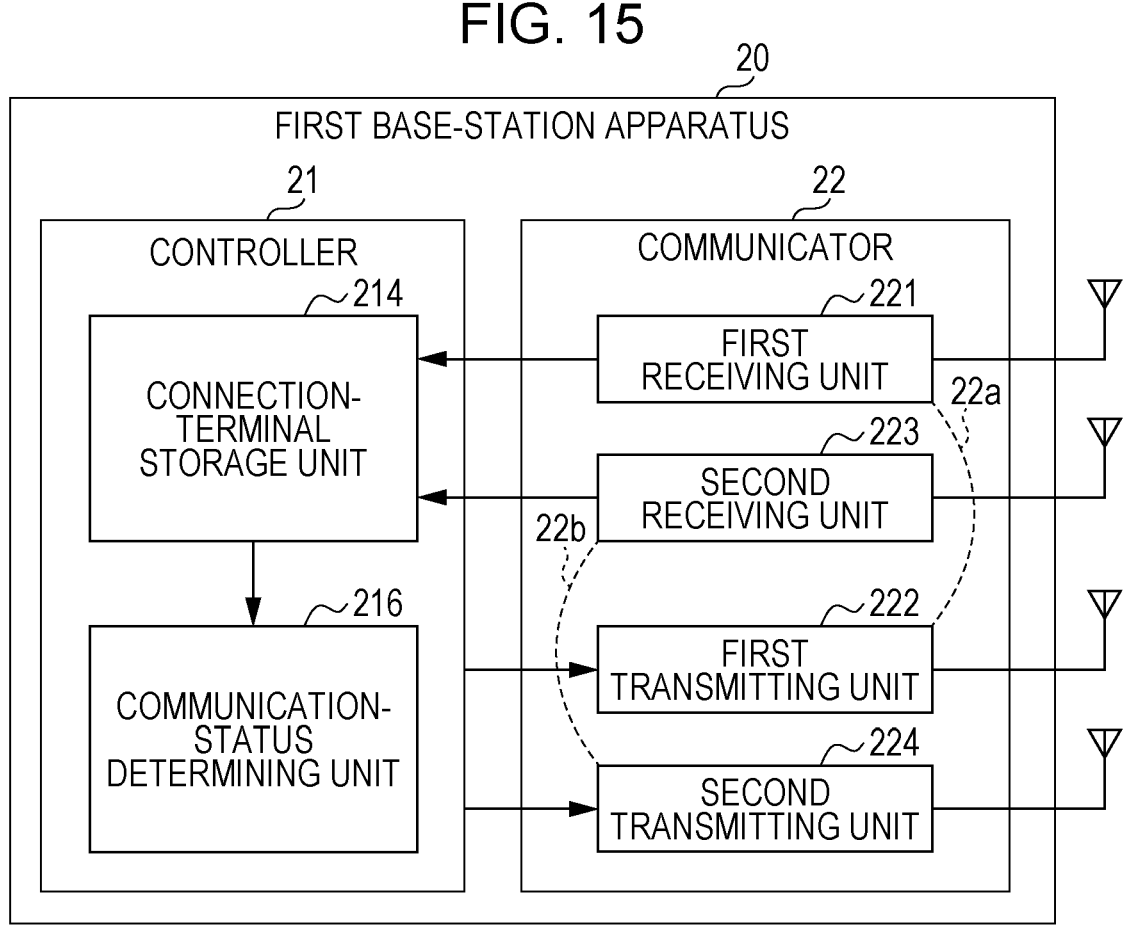
FIG. 15 is a schematic block diagram illustrating a configuration example of a first base-station apparatus according to the second embodiment.

FIG. 15 is a schematic block diagram illustrating a configuration example of the first base-station apparatus 20 according to the present embodiment.

The first base-station apparatus 20 includes a controller 21 and a communicator 22.

The controller 21 includes a connection-terminal storage unit 214 and a communication-status determining unit 216.

In the present embodiment, when the communication-status determining unit 216 determines that communication with a base-station apparatus different from the first base-station apparatus 20 is to be performed with respect to a terminal apparatus having a lower priority, the controller 21 transmits, to the terminal apparatus, communication instruction information indicating communication with the different base-station apparatus determined by the communication-status determining unit 216. However, although the controller 21 stops the communication with the terminal apparatus, it maintains the connection therewith without breaking the connection. The controller 21 maintains resources used for the connection with the terminal apparatus and releases resources related to communication of user data. The communication volume corresponding to the resources used for the connection is generally much smaller than the communication volume corresponding to the resources related to the communication of user data and may be at a negligible level.

When the un-used communication volume after the communication instruction information is transmitted becomes larger than the communication volume used for communication with the terminal apparatus 10 (a communication-start request terminal) related to communication for which the switching was performed, the communication-status determining unit 216 transmits, to the terminal apparatus 10 related to the communication for which the switching was performed, callback instruction information indicating callback from a base-station apparatus that was a switching-destination to the first base-station apparatus 20. The controller 21 then allocates resources used for communication of user data with the terminal apparatus 10 and resumes the communication of the user data.

Also, when the controller 21 receives, from the terminal apparatus 10, connection-release request information indicating releasing a maintained connection with the terminal apparatus 10, the controller 21 may release the connection. For example, when an instruction for ending communication with another party of the communication, ending the operation of the terminal apparatus 10, or the like is given by an operation, the controller 11 in the terminal apparatus 10 transmits connection-release request information to each base-station apparatus with which the connection has been maintained. As a result, unwanted communication connections are released.

The communicator 22 includes a first communicator 22a and a second communicator 22b. The first communicator 22a and the second communicator 22b perform communication with the terminal apparatus 10 in the coverage range by using the first wireless communication system and the second wireless communication system, respectively.

The first communicator 22a includes a first receiving unit 221 and a first transmitting unit 222. The second communicator 22b includes a second receiving unit 223 and a second transmitting unit 224.

Figure 16:
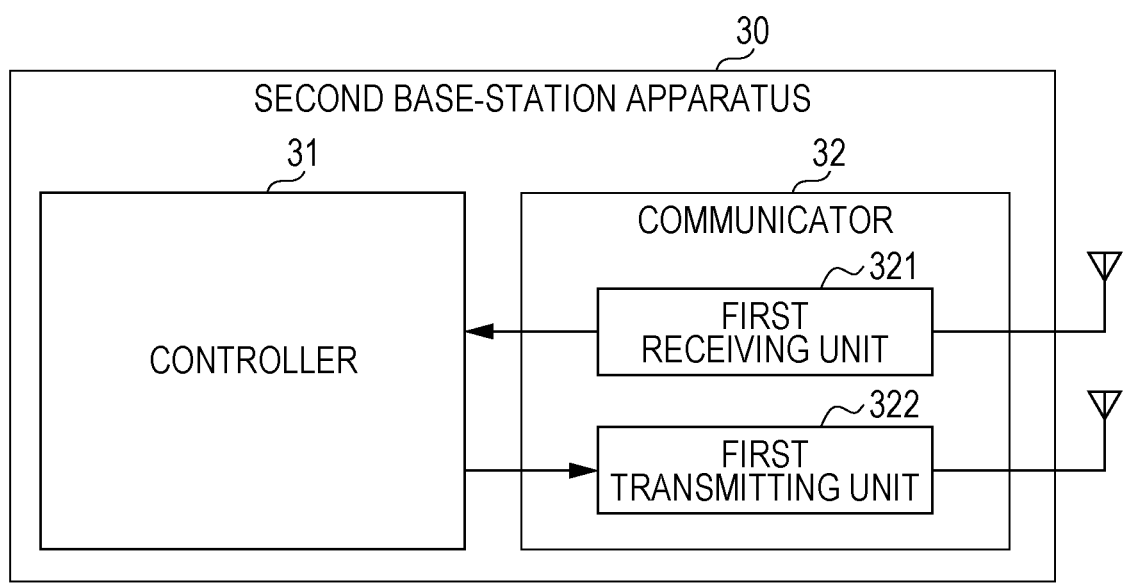
FIG. 16 is a schematic block diagram illustrating a configuration example of a second base-station apparatus according to the second embodiment.

FIG. 16 is a schematic block diagram illustrating a configuration example of the second base-station apparatus 30 according to the present embodiment.

The second base-station apparatus 30 includes a controller 31 and a communicator 32.

In the present embodiment, the callback-information monitoring unit 312 (FIG. 6) may be omitted from the controller 31.

Figure 17:
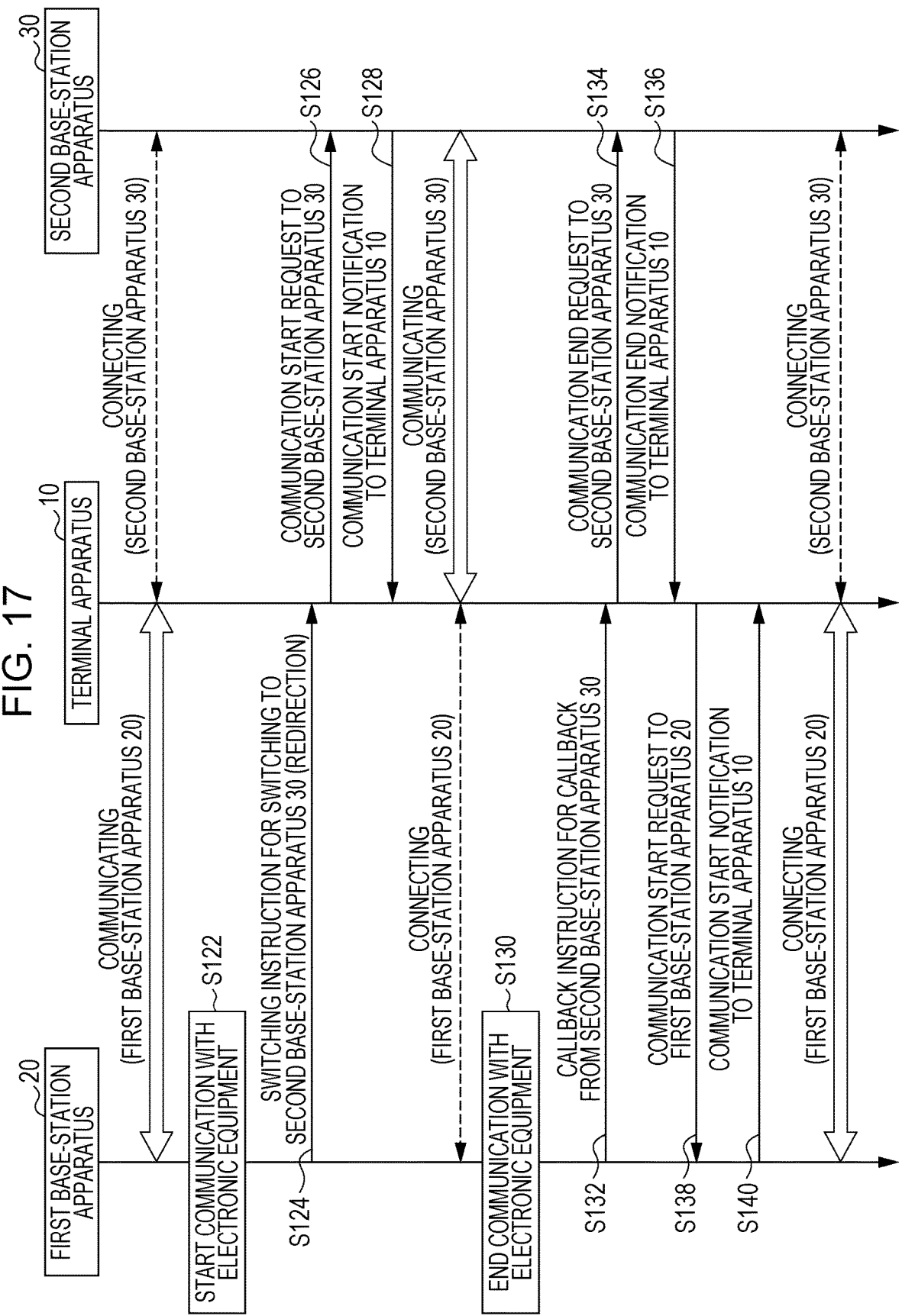
FIG. 17 is a sequence diagram illustrating one example of communication processing according to the second embodiment.

Next, a description will be given of one example of communication processing according to the present embodiment. FIG. 17 is a sequence diagram illustrating one example of communication processing according to the present embodiment.

Figure 11:
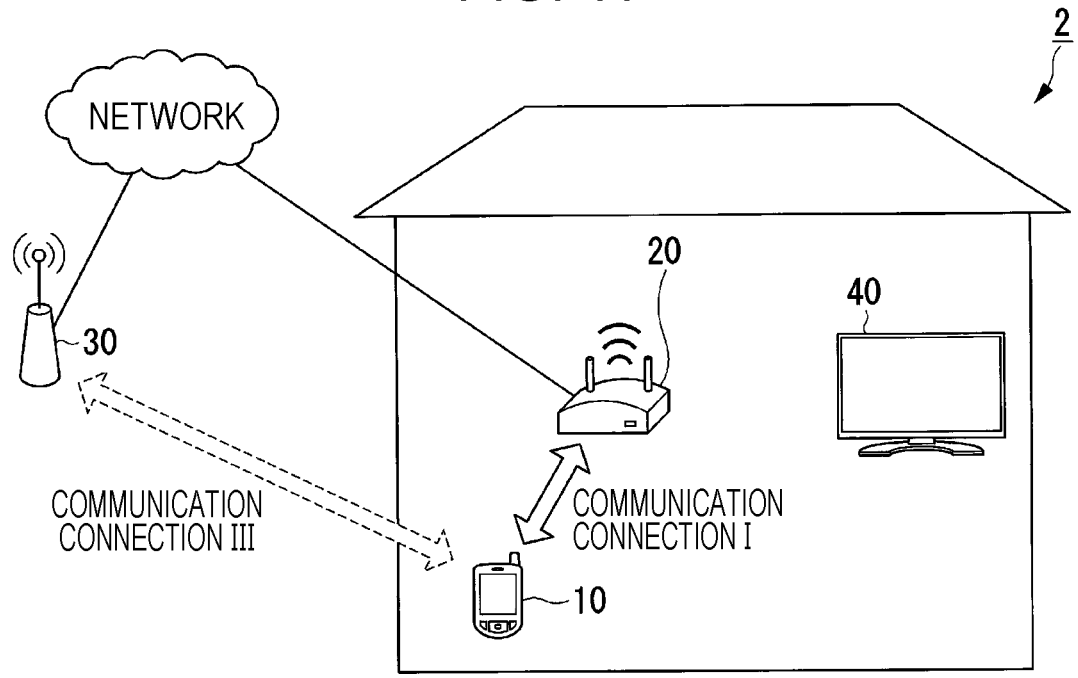
FIG. 11 is a conceptual diagram illustrating a first case in a communication system according to a second embodiment.

The example illustrated in FIG. 17 corresponds to a case in which the communication processing is started when the terminal apparatus 10, which is a mobile phone, establishes a communication connection I with the first base-station apparatus 20 to communicate user data therewith and maintains a communication connection III with the second base-station apparatus 30 but does not communicate user data therewith (see FIG. 11). In this example, it is assumed that the electronic equipment 40, which is an ultra-high-definition television, starts communication with the first base-station apparatus 20 (see FIG. 12), and then the communication between the first base-station apparatus 20 and the electronic equipment 40 ends (see FIG. 13).

In step S122, in response to an operation start instruction according to the user's operation, the electronic equipment 40 starts communication with the first base-station apparatus 20. The electronic equipment 40 transmits communication-start request information including the terminal information of the electronic equipment 40 to the first base-station apparatus 20.

The connection-terminal storage unit 214 in the first base-station apparatus 20 retrieves the terminal information from the communication-start request information received from the terminal apparatus 10 and stores the terminal information.

In step S124, the communication-status determining unit 216 in the first base-station apparatus 20 identifies the model of the terminal apparatus 10 and the model of the electronic equipment 40 and determines an un-used communication volume on the basis of the communication volume of communication with the electronic equipment 40 and the maximum communication volume. The communication-status determining unit 216 determines a communication volume used for communication with the terminal apparatus 10, and since the determined communication volume is larger than the un-used communication volume, the communication-status determining unit 216 determines that the communication with the electronic equipment 40 is given priority relative to the communication with the terminal apparatus 10.

On the basis of a measurement report from the terminal apparatus 10, the communication-status determining unit 216 designates the second base-station apparatus 30 as another base-station apparatus having a coverage range in which the terminal apparatus 10 is located, that is, as the serving base-station apparatus. The controller 21 transmits, to the terminal apparatus 10, communication instruction information that gives an instruction for communication using the second base-station apparatus 30. The controller 21 stops the communication of user data with the terminal apparatus 10 and releases resources for the communication. However, the controller 21 maintains the connection with the terminal apparatus 10.

Meanwhile, the controller 21 allocates resources used for the communication with the electronic equipment 40 and transmits communication-start notification information, together with resource information indicating the allocated resources, to the electronic equipment 40. Upon receiving the communication-start notification information from the first base-station apparatus 20, the electronic equipment 40 starts communication with the first base-station apparatus 20 by using the resources indicated by the resource information received together with the communication-start notification information. The electronic equipment 40 receives broadcast data from a server apparatus of a broadcast business operator via the first base-station apparatus 20.

In step S126, when the communication-enabling permission obtaining unit 112 in the terminal apparatus 10 receives the communication instruction information from the first base-station apparatus 20, the communication connection switching unit 114 transmits communication-start request information to the second base-station apparatus 30 indicated by the communication instruction information.

In step S128, upon receiving the communication-start notification information from the terminal apparatus 10, the controller 31 in the second base-station apparatus 30 allocates resources used for communication of user data with the terminal apparatus 10. The controller 31 transmits communication-start notification information, together with resource information indicating the allocated resources, to the terminal apparatus 10. Upon receiving the communication-start notification information from the second base-station apparatus 30, the controller 11 in the terminal apparatus 10 starts communication of user data with the second base-station apparatus 30 by using the resources indicated by the received resource information.

In step S130, in response to an operation end instruction according to the user's operation, the electronic equipment 40 ends the communication with the first base-station apparatus 20. The electronic equipment 40 transmits communication-end request information to the first base-station apparatus 20.

Upon receiving the communication-end request information from the electronic equipment 40, the controller 21 in the first base-station apparatus 20 releases the resources allocated to the communication with the electronic equipment 40 and breaks the connection with the electronic equipment 40. The controller 21 also deletes the terminal information of the electronic equipment 40, the terminal information being stored in the connection-terminal storage unit 214. The controller 21 transmits communication-end notification information to the electronic equipment 40. Upon receiving the communication-end notification information from the first base-station apparatus 20, the electronic equipment 40 stops operating.

In step S132, by referring to terminal information stored in the connection-terminal storage unit 214, the communication-status determining unit 216 in the first base-station apparatus 20 determines that the communication with the electronic equipment 40 is ended and determines an un-used communication volume. At this point in time, the communication-status determining unit 216 determines that the un-used communication volume is larger than the communication volume used for the communication with the terminal apparatus 10. The communication-status determining unit 216 then refers to the stored switching communication information to identify the terminal apparatus 10 related to the communication for which the switching was performed. Thereafter, the controller 21 transmits, to the terminal apparatus 10, callback instruction information indicating callback of the serving base-station apparatus from the second base-station apparatus 30 to the first base-station apparatus 20.

In step S134, when the communication-enabling permission obtaining unit 112 in the terminal apparatus 10 receives the callback instruction information from the first base-station apparatus 20, the communication connection switching unit 114 switches the serving base-station apparatus from the second base-station apparatus 30 to the first base-station apparatus 20. At this point in time, the communication connection switching unit 114 transmits communication-end request information to the second base-station apparatus 30.

In step S136, the controller 31 in the second base-station apparatus 30 receives the communication-end request information from the terminal apparatus 10 and stops the communication of user data with the terminal apparatus 10. The controller 31 transmits communication-end notification information to the terminal apparatus 10.

However, the controller 31 maintains the connection with the terminal apparatus 10 without breaking the connection. The controller 31 ensures resources used for the connection and releases resources used for the communication of the user data.

In step S138, upon receiving the communication-end notification information from the second base-station apparatus 30, the controller 11 in the terminal apparatus 10 transmits communication-start request information to the first base-station apparatus 20.

In step S140, the controller 21 in the first base-station apparatus 20 stores, in the connection-terminal storage unit 214, the terminal information included in the communication-start request information received from the terminal apparatus 10. The communication-status determining unit 216 determines that the communication with the terminal apparatus 10 is to be started. The communication-status determining unit 216 allocates resources used for communication of user data with the terminal apparatus 10 and transmits communication-start notification information including resource information indicating the allocated resources to the terminal apparatus 10. Thereafter, the controller 11 in the terminal apparatus 10 resumes the communication with the first base-station apparatus 20 by using the resources indicated by the resource information included in the communication-start notification information received from the first base-station apparatus 20. Thereafter, the processing illustrated in FIG. 17 ends.

Figure 18:
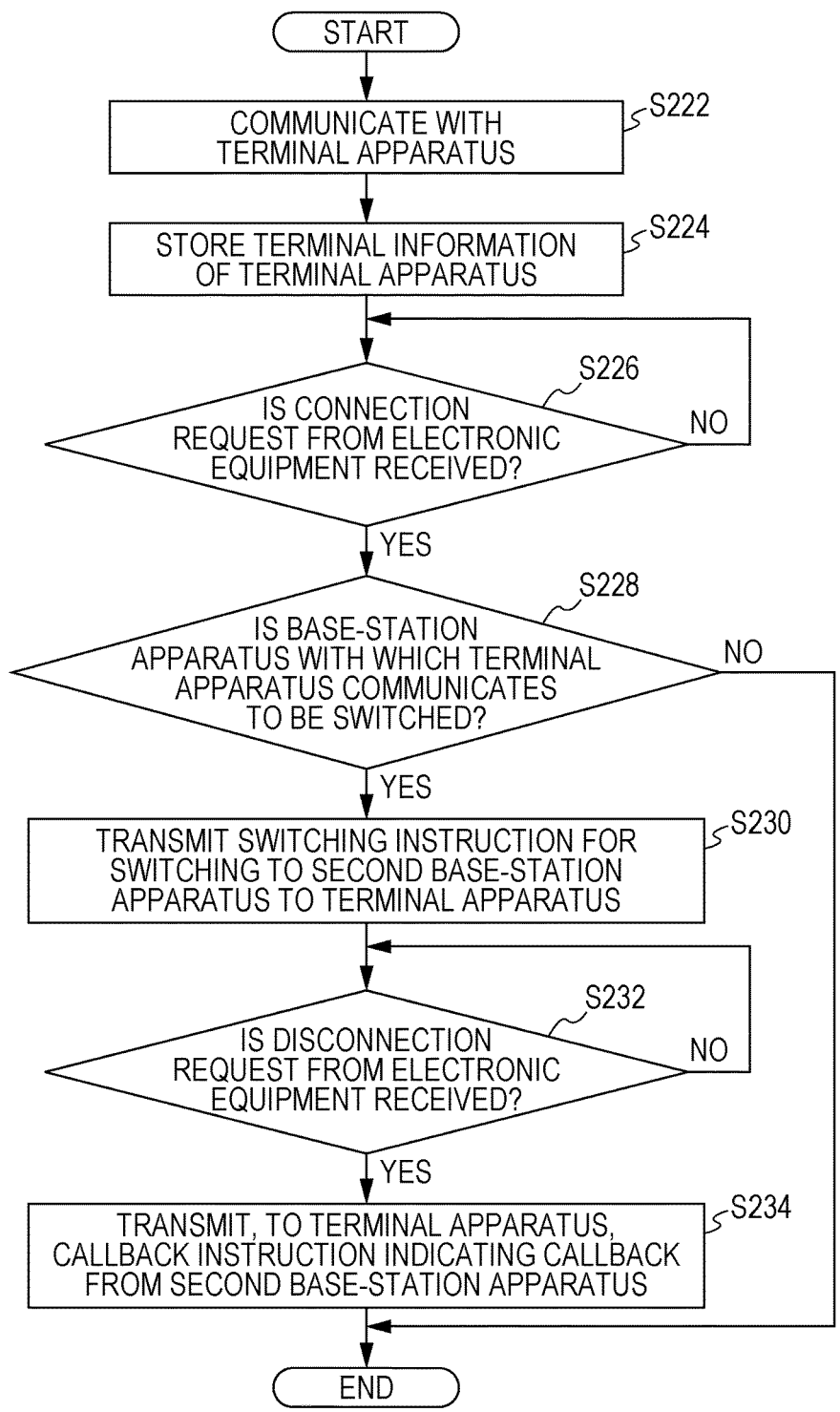
FIG. 18 is a flowchart illustrating a processing example of the first base-station apparatus according to the second embodiment.

Next, a description will be given of a processing example in the first base-station apparatus 20, the second base-station apparatus 30, and the terminal apparatus 10 according to the present embodiment. The processing example described below corresponds to the operations of the apparatuses in the processing illustrated in FIG. 17. FIG. 18 is a flowchart illustrating a processing example in the first base-station apparatus 20 according to the present embodiment.

In step S222, for starting communication with the terminal apparatus 10, the controller 21 receives communication-start request information from the terminal apparatus 10. Thereafter, the flow proceeds to a process in step S224.

In step S224, the communication-status determining unit 216 stores the terminal information of the terminal apparatus 10 in the connection-terminal storage unit 214. Thereafter, the flow proceeds to a process in step S226.

In step S226, the controller 21 waits for receiving communication-start request information (a connection request) from the electronic equipment 40, and when the controller 21 receives the communication-start request information (YES in step S226), the flow proceeds to a process in step S228. When the controller 21 does not receive the communication-start request information (NO in step S226), it repeats the process in step S226.

In step S228, the communication-status determining unit 216 identifies the model of the terminal apparatus 10 and the model of the electronic equipment 40 and determines an un-used communication volume on the basis of the communication volume of communication with the terminal apparatus 10 and the maximum communication volume. By comparing the communication volume used for communication with the electronic equipment 40 with the un-used communication volume, the communication-status determining unit 216 determines whether or not the base-station apparatus with which the terminal apparatus 10 communicates is to be switched by giving higher priority to the communication with the electronic equipment 40 than to the communication with the terminal apparatus 10. When the communication-status determining unit 216 determines that the base-station apparatus is to be switched (YES in step S228), the flow proceeds to a process in step S230. When the communication-status determining unit 216 determines that the base-station apparatus is not to be switched (NO in step S228), the controller 21 maintains the connection with the terminal apparatus 10 to continue the communication with the terminal apparatus 10. Thereafter, the controller 21 ends the processing illustrated in FIG. 18.

In step S230, on the basis of a measurement report from the terminal apparatus 10, the communication-status determining unit 216 designates the second base-station apparatus 30 as another base-station apparatus having a coverage range in which the terminal apparatus 10 is located. The controller 21 transmits communication instruction information indicating switching to the second base-station apparatus 30 to the terminal apparatus 10. However, the controller 21 maintains the connection with the terminal apparatus 10. Thereafter, the flow proceeds to a process in step S232.

In step S232, the controller 21 waits for receiving communication-end request information (a disconnection request) from the electronic equipment 40, and when the controller 21 receives the communication-end request information (YES in step S232), the flow proceeds to a process in step S234. When the controller 21 does not receive the communication-end request information, it repeats the process in step S232.

In step S234, the controller 21 releases the resources allocated to the communication with the electronic equipment 40, breaks the connection with the electronic equipment 40, and deletes the terminal information of the electronic equipment 40, the terminal information being stored in the connection-terminal storage unit 214. By referring to terminal information stored in the connection-terminal storage unit 214, the communication-status determining unit 216 determines that the communication with the electronic equipment 40 is ended and determines an un-used communication volume. By referring to the stored switching communication information, the communication-status determining unit 216 identifies the terminal apparatus 10 related to the communication for which the switching was performed and the second base-station apparatus 30 that is the switching destination. Thereafter, the controller 21 transmits, to the terminal apparatus 10, callback instruction information indicating callback of the serving base-station apparatus from the second base-station apparatus 30 to the first base-station apparatus 20. Thereafter, the processing illustrated in FIG. 18 ends.

Figure 19:
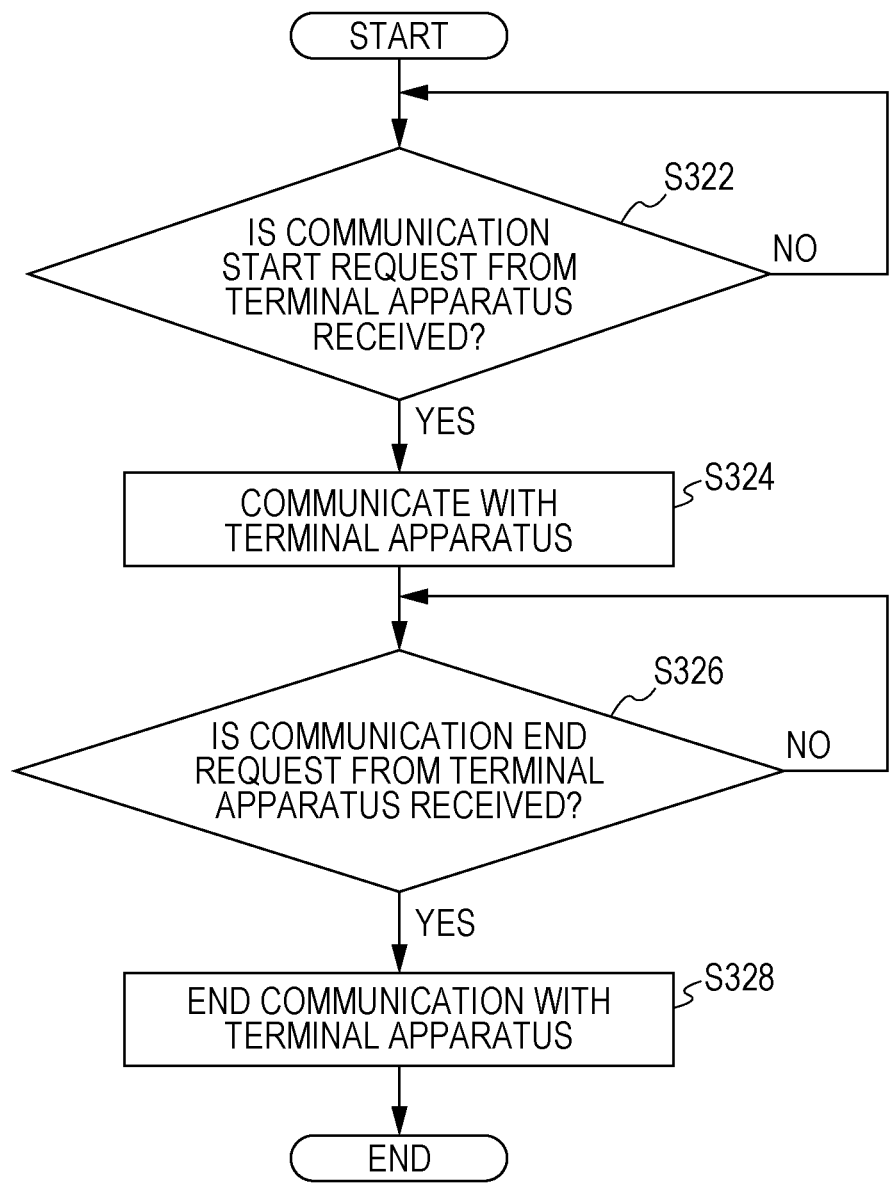
FIG. 19 is a flowchart illustrating a processing example of the second base-station apparatus according to the second embodiment.

FIG. 19 is a flowchart illustrating a processing example in the second base-station apparatus 30 according to the present embodiment. Since processes in steps S322 and S324 are substantially the same as the processes in steps S302 and S304, respectively, descriptions thereof are not given hereinafter.

In step S324, communication with the terminal apparatus 10 is started using resources allocated by the controller 31, and then the flow proceeds to a process in step S326. In step S326, the controller 31 waits for receiving communication-end request information from the terminal apparatus 10 and determines whether or not the communication-end request information is received. When the controller 31 receives the communication-end request information (YES in step S326), the flow proceeds to a process in step S328. When the controller 31 does not receive the communication-end request information (NO in step S326), it repeats the process in step S326.

In step S328, the controller 31 ends the communication with the terminal apparatus 10 and releases the resource used for communication of user data with the terminal apparatus 10. Thereafter, the controller 31 transmits communication-end notification information to the terminal apparatus 10. However, the controller 31 maintains the connection with the terminal apparatus 10. Thereafter, the processing illustrated in FIG. 19 ends.

Figure 20:
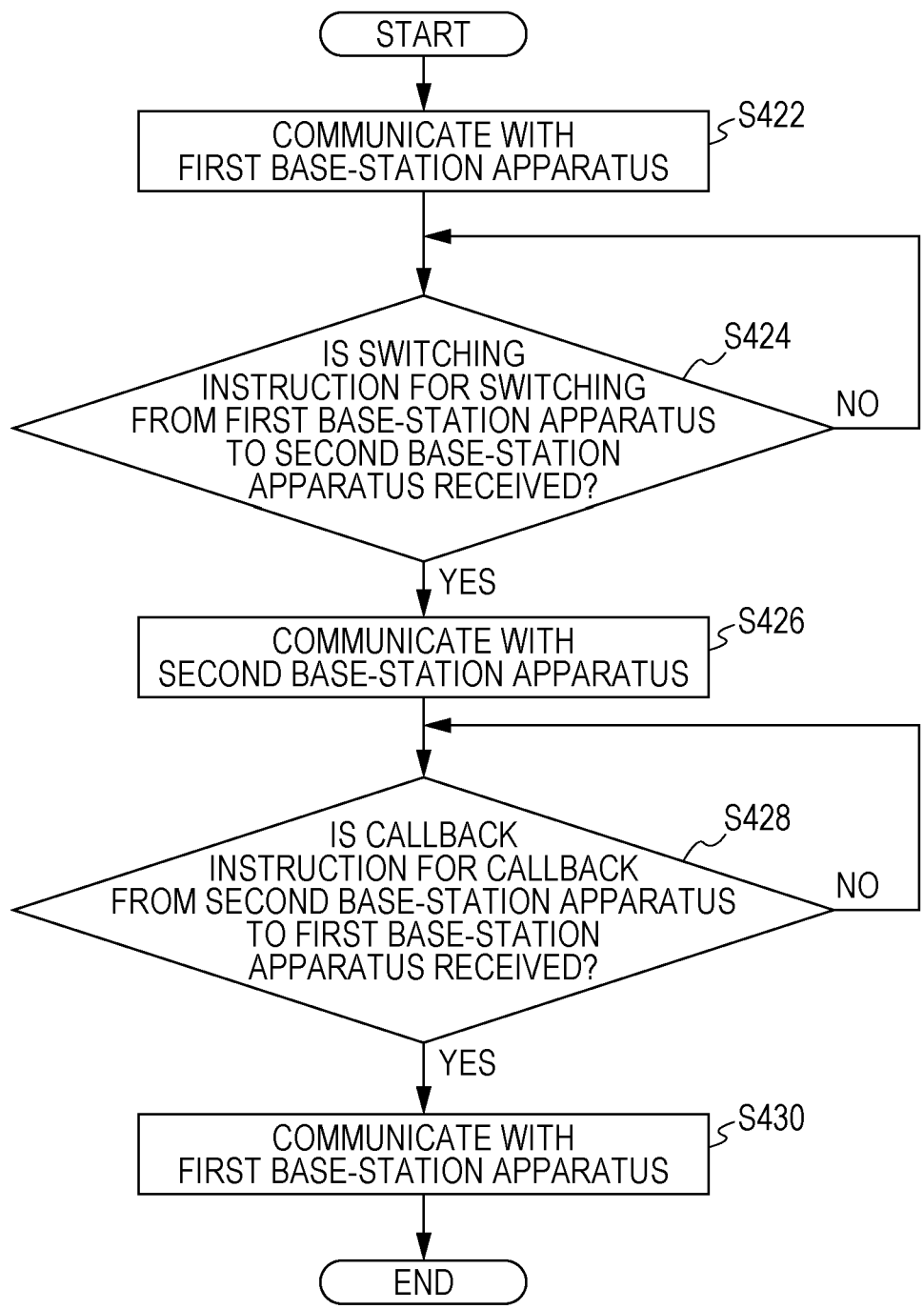
FIG. 20 is a flowchart illustrating a processing example of the terminal apparatus according to the second embodiment.

FIG. 20 is a flowchart illustrating a processing example in the terminal apparatus 10 according to the present embodiment.

Since processes in steps S422, S424, and S426 are substantially the same as the processes in steps S402, S404, and S406, respectively, descriptions thereof are not given hereinafter.

In step S426, the controller 11 starts communication with the second base-station apparatus 30, and then the flow proceeds to a process in step S428. However, the controller 11 maintains the connection with the first base-station apparatus 20.

In step S428, the communication-enabling permission obtaining unit 112 waits for receiving, from the first base-station apparatus 20, callback instruction information indicating callback of the serving base station from the second base-station apparatus 30 to the first base-station apparatus 20 and determines whether or not the callback instruction information is received. When the communication-enabling permission obtaining unit 112 receives the callback instruction information (YES in step S428), the flow proceeds to a process in step S430. When the communication-enabling permission obtaining unit 112 does not receive the callback instruction information (NO in step S428), it repeats the process in step S428.

In step S430, the communication connection switching unit 114 switches the serving base-station apparatus from the second base-station apparatus 30 to the first base-station apparatus 20 indicated by the communication instruction information. In this case, the processing in which the controller 11 switches the base-station apparatus and starts communication with the first base-station apparatus 20 may be the same as the process in step S410. However, the controller 11 maintains the connection with the second base-station apparatus 30. Thereafter, the processing illustrated in FIG. 20 ends.

Figure 21:
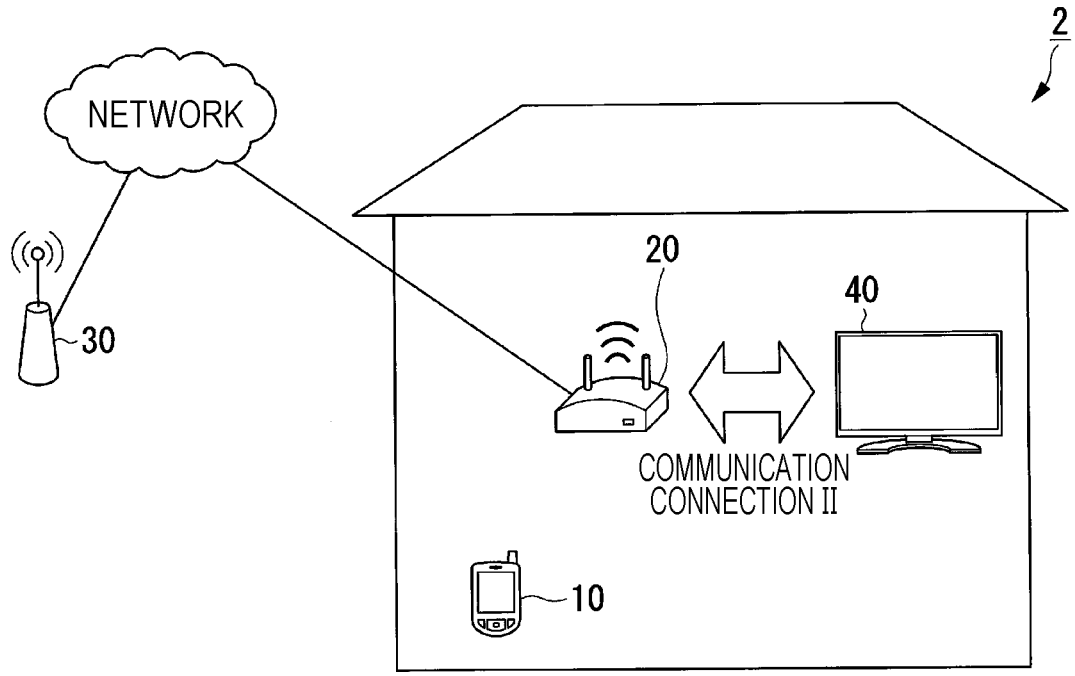
FIG. 21 is a conceptual diagram illustrating a first case in a communication system according to a modification of the second embodiment.
Figure 22:
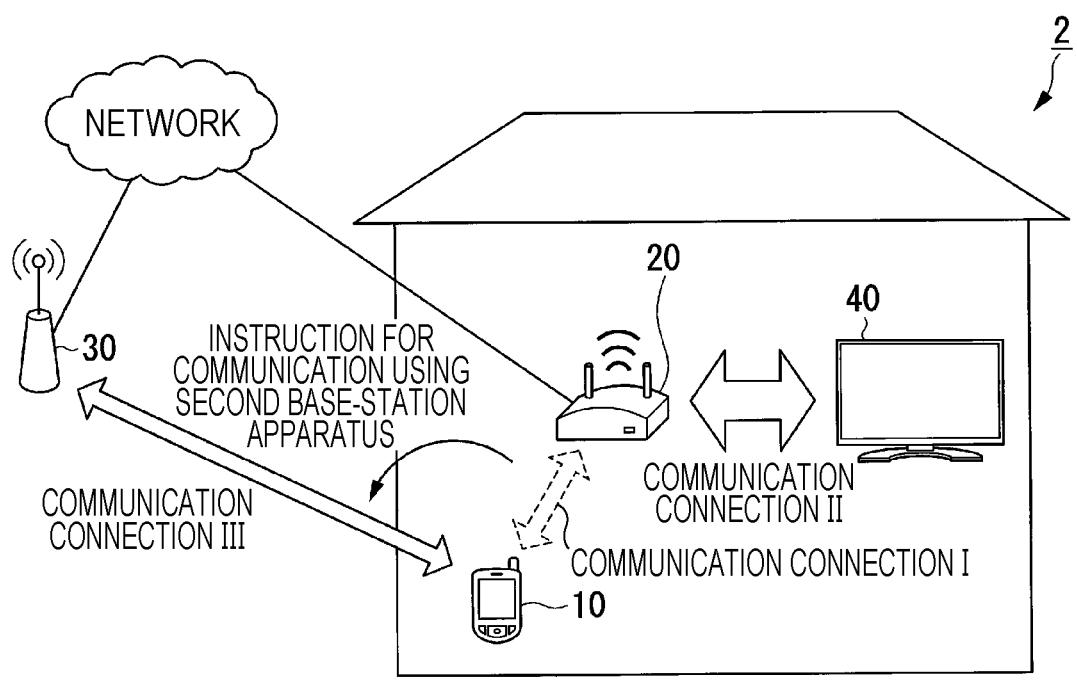
FIG. 22 is a conceptual diagram illustrating a second case in the communication system according to the modification of the second embodiment.

Next, a description will be given of another example of the communication processing according to the present embodiment. In the example illustrated in FIG. 21, however, it is assumed that the first base-station apparatus 20 and the electronic equipment 40 have already established a communication connection II to communicate with each other. Meanwhile, electric power has not been supplied to the terminal apparatus 10 (a power supply is turned off), and the functions of the terminal apparatus 10 are stopped. Thereafter, as illustrated in FIG. 22, the terminal apparatus 10 starts operating (the power supply is turned on) and attempts to start communication with the first base-station apparatus 20 to establish a communication connection I. At this point in time, the communication-status determining unit 216 in the first base-station apparatus 20 determines that the priority of the terminal apparatus 10 is lower than the priority of the electronic equipment 40. The communication-status determining unit 216 identifies the second base-station apparatus 30 having a coverage range in which the terminal apparatus 10 is located and issues, to the terminal apparatus 10, an instruction indicating the second base-station apparatus 30 as the serving base-station apparatus. The terminal apparatus 10 maintains the communication connection I. Meanwhile, the terminal apparatus 10 issues a communication request to the second base-station apparatus 30 and establishes a communication connection III to start communication of user data.

Figure 23:
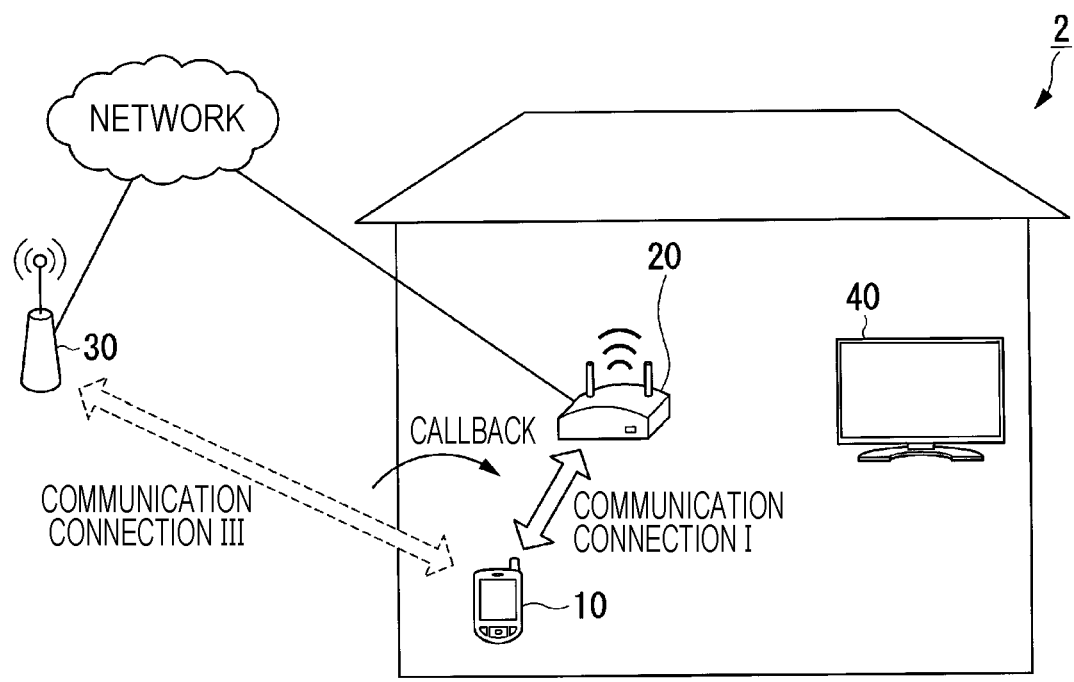
FIG. 23 is a conceptual diagram illustrating a third case in the communication system according to the modification of the second embodiment.

Thereafter, when the communication with the electronic equipment 40 which became a cause for the switching of the serving base-station apparatus ends, the first base-station apparatus 20 determines that the un-used communication volume exceeds the communication volume used for communication with the terminal apparatus 10. As illustrated in FIG. 23, the first base-station apparatus 20 transmits, to the terminal apparatus 10, callback instruction information indicating callback of the serving base-station apparatus to the pre-switching first base-station apparatus 20. The terminal apparatus 10 then switches the serving base-station apparatus from the second base-station apparatus 30 to the first base-station apparatus 20. At this point in time, the communication connection III between the second base-station apparatus 30 and the terminal apparatus 10 is maintained.

Next, a description will be given of another example of the communication processing according to the present embodiment.

Figure 24:
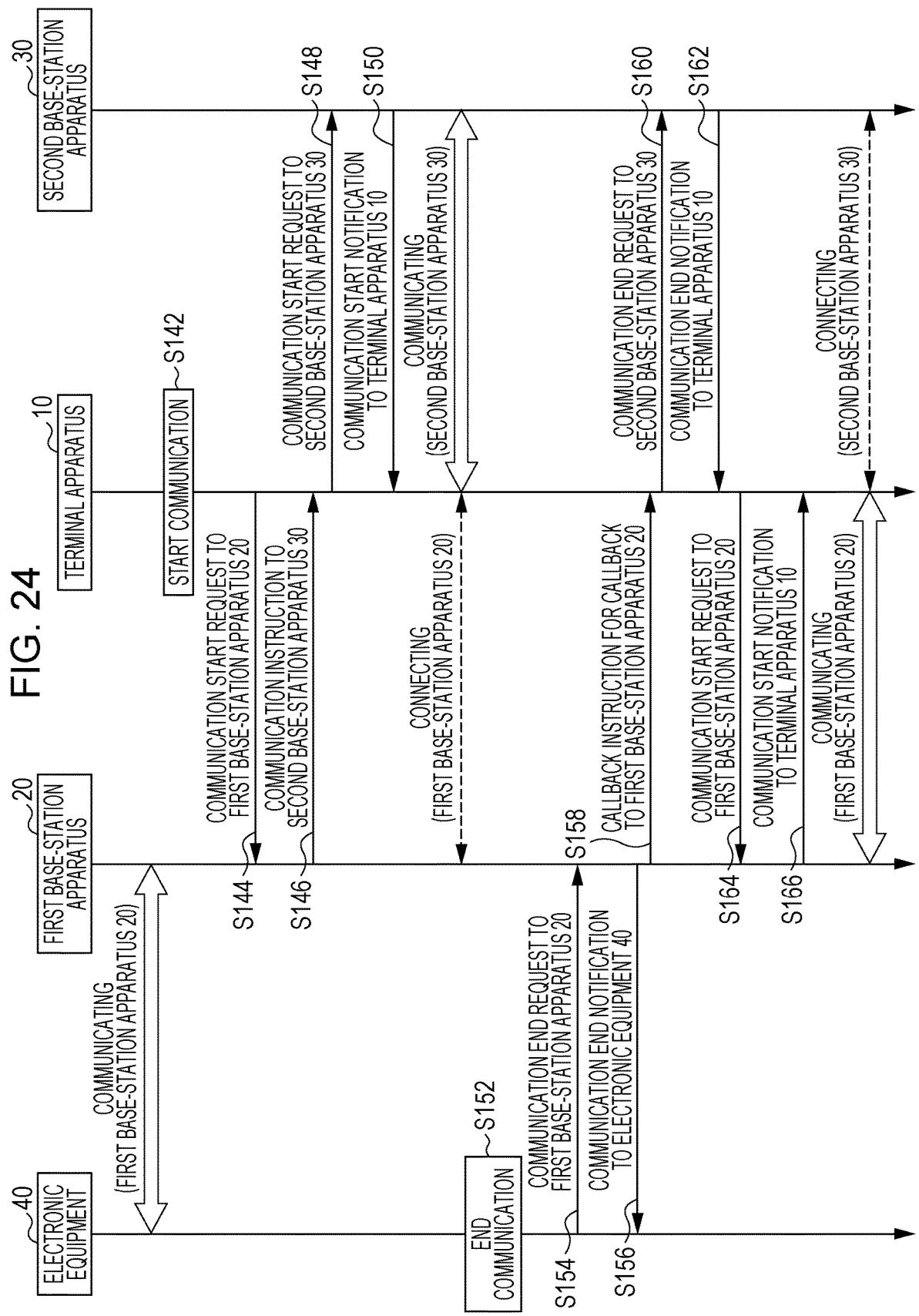
FIG. 24 is a sequence diagram illustrating one example of communication processing according to the modification of the second embodiment.

FIG. 24 is a sequence diagram illustrating another example of the communication processing according to the present embodiment. The processing illustrated in FIG. 24 is an example of a case in which the process sequentially transitions to the situations illustrated in FIGS. 21, 22, and 23.

In step S142, in response to a communication start instruction according to the user's operation, the controller 11 in the terminal apparatus 10 starts communication with the first base-station apparatus 20.

In step S144, the controller 11 transmits communication-start request information including the terminal information of the terminal apparatus 10 to the first base-station apparatus 20. The connection-terminal storage unit 214 in the first base-station apparatus 20 retrieves the terminal information from the communication-start request information received from the terminal apparatus 10 and stores the retrieved terminal information.

In step S146, the communication-status determining unit 216 in the first base-station apparatus 20 identifies the model of the terminal apparatus 10 and the model of the electronic equipment 40 and determines an un-used communication volume on the basis of the communication volume of communication with the electronic equipment 40 and the maximum communication volume. The communication-status determining unit 216 determines a communication volume used for communication with the terminal apparatus 10, and since the determined communication volume is larger than the un-used communication volume, the communication-status determining unit 216 determines that communication with the electronic equipment 40 is given priority relative to the communication with the terminal apparatus 10.

On the basis of a measurement report from the terminal apparatus 10, the communication-status determining unit 216 designates the second base-station apparatus 30 as another base-station apparatus having a coverage range in which the terminal apparatus 10 is located. The controller 21 transmits communication instruction information that gives an instruction for communication using the second base-station apparatus 30 to the terminal apparatus 10. However, although the controller 21 does not perform communication of user data with the terminal apparatus 10, it establishes a connection with the terminal apparatus 10 and ensures resources used for the connection.

In step S148, when the communication-enabling permission obtaining unit 112 in the terminal apparatus 10 receives the communication instruction information from the first base-station apparatus 20, the communication connection switching unit 114 transmits communication-start request information to the second base-station apparatus 30 indicated by the communication instruction information.

In step S150, upon receiving the communication-start notification information received from the terminal apparatus 10, the controller 31 in the second base-station apparatus 30 allocates resources used for communication with the terminal apparatus 10. The controller 31 transmits communication-start notification information, together with resource information indicating the allocated resources, to the terminal apparatus 10. Upon receiving the communication-start notification information from the second base-station apparatus 30, the controller 11 in the terminal apparatus 10 starts communication with the second base-station apparatus 30 by using the resources indicated by the received resource information.

In step S152, in response to an operation end instruction according to the user's operation, the electronic equipment 40 ends receiving reception signals from the first base-station apparatus 20 (that is, ends the communication).

In step S154, the electronic equipment 40 transmits communication-end request information to the first base-station apparatus 20. Upon receiving the communication-end request information from the electronic equipment 40, the controller 21 in the first base-station apparatus 20 releases the resources allocated to the communication with the electronic equipment 40 and breaks the connection with the electronic equipment 40. The controller 21 also deletes the terminal information of the electronic equipment 40, the terminal information being stored in the connection-terminal storage unit 214.

In step S156, the controller 21 in the first base-station apparatus 20 transmits communication-end notification information to the electronic equipment 40. Upon receiving the communication-end notification information from the first base-station apparatus 20, the electronic equipment 40 ends operating.

In step S158, by referring to terminal information stored in the connection-terminal storage unit 214, the communication-status determining unit 216 in the first base-station apparatus 20 determines that the communication with the electronic equipment 40 is ended and determines an un-used communication volume. At this point in time, the communication-status determining unit 216 determines that the un-used communication volume is larger than the communication volume used for the communication with the terminal apparatus 10. Also, by referring to the stored switching communication information, the communication-status determining unit 216 identifies the terminal apparatus 10 related to the communication for which the switching was performed and the second base-station apparatus 30 that is the switching destination. Thereafter, the controller 21 transmits, to the terminal apparatus 10, callback instruction information indicating callback of the serving base-station apparatus from the second base-station apparatus 30 to the first base-station apparatus 20.

In step S160, when the communication-enabling permission obtaining unit 112 in the terminal apparatus 10 receives the callback instruction information from the first base-station apparatus 20, the communication connection switching unit 114 switches the serving base-station apparatus from the second base-station apparatus 30 to the first base-station apparatus 20. At this point in time, the communication connection switching unit 114 transmits communication-end request information to the second base-station apparatus 30.

In step S162, the controller 31 in the second base-station apparatus 30 receives the communication-end request information from the terminal apparatus 10 and stops the communication of the user data with the terminal apparatus 10. The controller 31 transmits communication-end notification information to the terminal apparatus 10. However, the controller 31 maintains the connection with the terminal apparatus 10 without breaking the connection. The controller 31 ensures minimum resources used for the connection and releases the resources used for the communication of the user data.

In step S164, upon receiving the communication-end notification information from the second base-station apparatus 30, the controller 11 in the terminal apparatus 10 transmits communication-start request information to the first base-station apparatus 20.

In step S166, the controller 21 in the first base-station apparatus 20 stores, in the connection-terminal storage unit 214, the terminal information included in the communication-start request information received from the terminal apparatus 10. The communication-status determining unit 216 determines that communication with the terminal apparatus 10 is to be started. The communication-status determining unit 216 allocates resources used for communication of user data with the terminal apparatus 10 and transmits communication-start notification information including resource information indicating the allocated resources to the terminal apparatus 10. Upon receiving the communication-start notification information from the first base-station apparatus 20, the controller 11 in the terminal apparatus 10 resumes the communication with the first base-station apparatus 20 by using the resources indicated by the resource information included in the communication-start notification information. Thereafter, the processing illustrated in FIG. 24 ends.

Next, a description will be given of another processing example in the first base-station apparatus 20, the second base-station apparatus 30, and the terminal apparatus 10 according to the present embodiment. The processing example described below corresponds to the operations of the apparatuses in the processing illustrated in FIG. 24.

Figure 25:
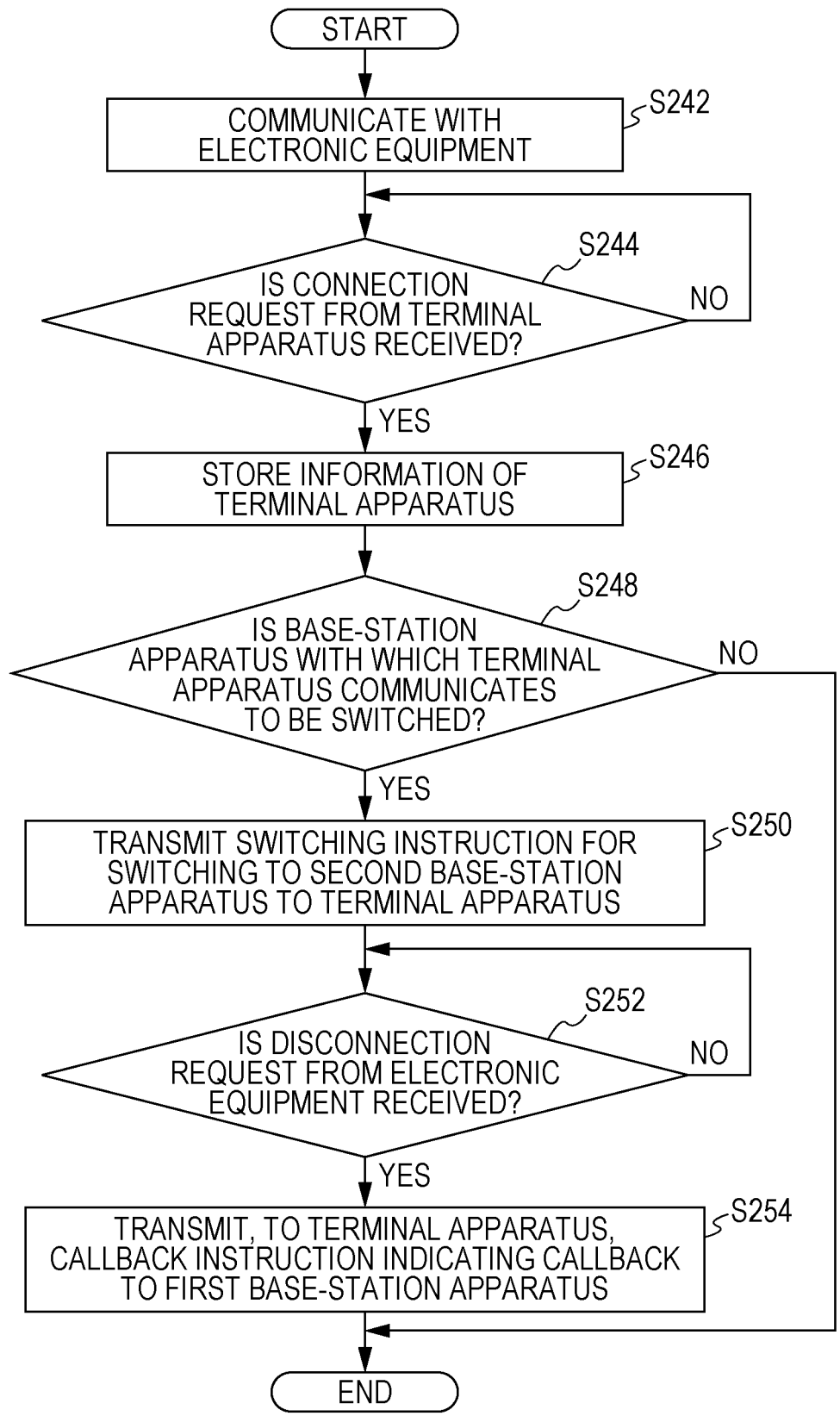
FIG. 25 is a flowchart illustrating a processing example of a first base-station apparatus according to the modification of the second embodiment.

FIG. 25 is a flowchart illustrating another processing example in the first base-station apparatus 20 according to the present embodiment.

In step S242, the controller 21 establishes a connection with the electronic equipment 40 to start communication of user data with the electronic equipment 40.

In step S244, the controller 21 waits for receiving communication-start request information (a connection request) from the terminal apparatus 10, and when the controller 21 receives the communication request information (YES in step S244), the flow proceeds to a process in step S246. When the controller 21 does not receive the communication request information (NO in step S244), it continues the process in step S244.

In step S246, the connection-terminal storage unit 214 retrieves the terminal information from the communication-start request information received by the controller 21 and stores the terminal information. Thereafter, the flow proceeds to a process in step S248.

In step S248, the communication-status determining unit 216 determines whether or not the base-station apparatus with which the terminal apparatus 10 communicates is to be switched by giving higher priority to the communication with the electronic equipment 40 than to the communication with the terminal apparatus 10. When the communication-status determining unit 216 determines that the base-station apparatus is to be switched (YES in step S248), the flow proceeds to a process in step S250. When the communication-status determining unit 216 determines that the base-station apparatus is not to be switched (NO in step S248), the controller 21 establishes a connection with the terminal apparatus 10 to start communication with the terminal apparatus 10. Thereafter, the controller 21 ends the processing illustrated in FIG. 25.

In step S250, on the basis of a measurement report from the terminal apparatus 10, the communication-status determining unit 216 designates the second base-station apparatus 30 as another base-station apparatus having a coverage range in which the terminal apparatus 10 is located.

Thereafter, the communication-status determining unit 216 transmits communication instruction information that gives an instruction for communication using the second base-station apparatus 30 to the terminal apparatus 10. However, the controller 21 maintains the connection with the terminal apparatus 10. Thereafter, the flow proceeds to a process in step S252.

In step S252, the controller 21 waits for receiving communication-end request information (a disconnection request) from the electronic equipment 40, and when the controller 21 receives the communication-end request information (YES in step S252), the flow proceeds to a process in step S254. When the controller 21 does not receive the communication-end request information (NO in step S252), it repeats the process in step S252.

In step S254, the controller 21 breaks the connection with the electronic equipment 40 and identifies the terminal apparatus 10 related to the communication for which the switching was performed and the second base-station apparatus 30 that is the switching destination. Since the processing in which the controller 21 breaks the connection with the electronic equipment 40 and identifies the terminal apparatus 10 related to the communication for which the switching was performed and the second base-station apparatus 30 that is the switching destination is substantially the same as the process in step S214, a description thereof is not given hereinafter.

Thereafter, the controller 21 transmits, to the terminal apparatus 10, callback instruction information indicating callback from the second base-station apparatus 30 to the first base-station apparatus 20. Thereafter, the processing illustrated in FIG. 25 ends.

Figure 26:
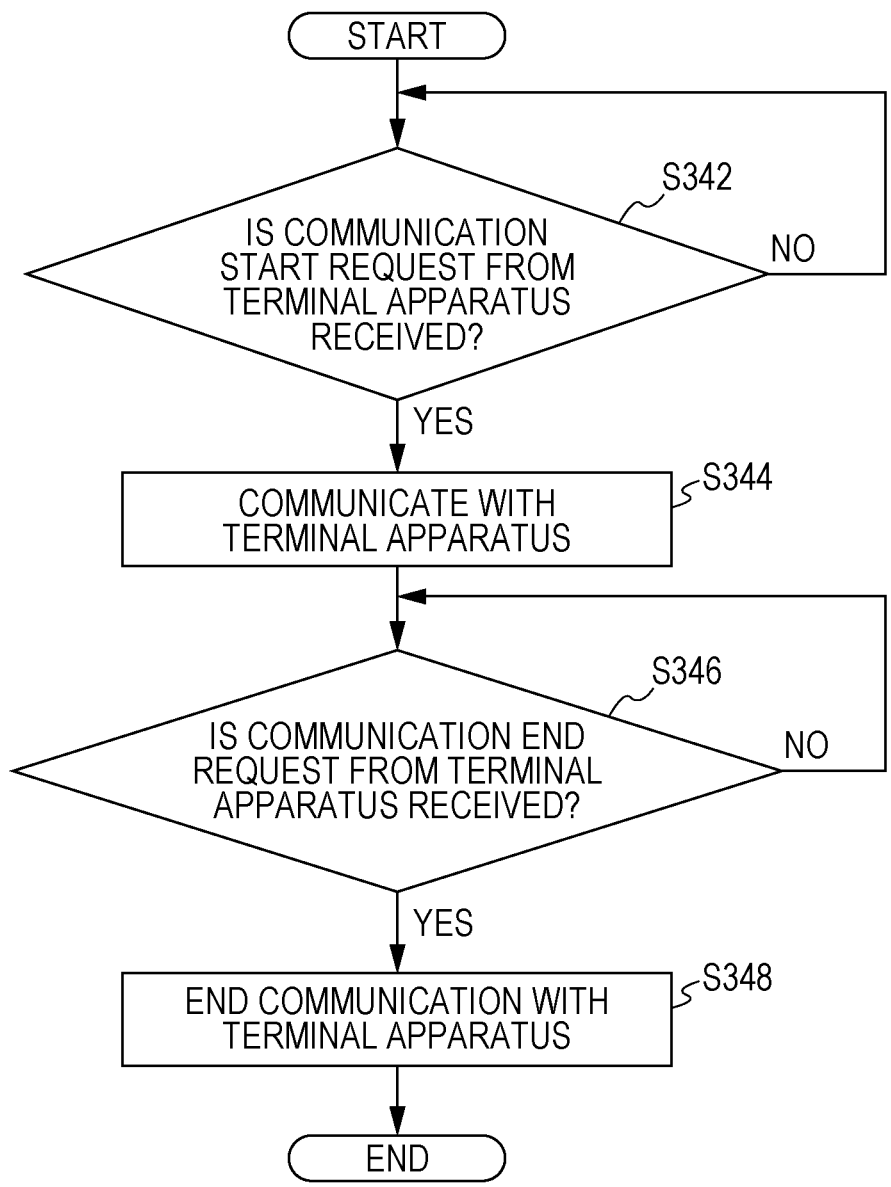
FIG. 26 is a flowchart illustrating a processing example of a second base-station apparatus according to the modification of the second embodiment.

FIG. 26 is a flowchart illustrating a processing example in the second base-station apparatus 30 according to the present embodiment. Since processes in steps S342 and S344 in FIG. 26 are substantially the same as the processes in steps S322 and S324 in FIG. 19, respectively, descriptions thereof are not given hereinafter.

In step S346, the controller 31 waits for receiving communication-end request information from the terminal apparatus 10 and determines whether or not the communication-end request information is received. When the controller 31 receives the communication-end request information (YES in step S346), the flow proceeds to a process in step S348. When the controller 31 does not receive the communication-end request information (NO in step S346), it repeats the process in step S346.

In step S348, the controller 31 stops communication of user data with the terminal apparatus 10. The controller 31 transmits communication-end notification information to the terminal apparatus 10. However, the controller 31 maintains the connection with the terminal apparatus 10. Thereafter, the processing illustrated in FIG. 26 ends.

FIG. 27 is a flowchart illustrating a processing example in the terminal apparatus 10 according to the present embodiment.

In step S442, in response to a communication start instruction according to an operation, the controller 11 transmits communication-start request information (a connection request) to the first base-station apparatus 20 having a coverage range in which the terminal apparatus 10 is located. Thereafter, the flow proceeds to a process in step S444.

In step S444, the communication-enabling permission obtaining unit 112 waits for receiving communication instruction information (a switching instruction) from the first base-station apparatus 20 and determines whether or not the communication instruction information is received. When the communication-enabling permission obtaining unit 112 receives the communication instruction information (YES in step S444), the flow proceeds to a process in step S446. When the communication-enabling permission obtaining unit 112 does not receive the communication instruction information (NO in step S444), the flow proceeds to a process in step S450.

In step S446, the communication connection switching unit 114 transmits communication-start request information to the second base-station apparatus 30 indicated by the communication instruction information. Upon receiving the communication-start notification information from the second base-station apparatus 30, the controller 11 starts communication with the second base-station apparatus 30 by using resources indicated by the resource information received together with the communication start information. Thereafter, the flow proceeds to a process in step S448.

In step S448, the communication-enabling permission obtaining unit 112 waits for receiving callback instruction information from the first base-station apparatus 20 and determines whether or not the callback instruction information is received. When the communication-enabling permission obtaining unit 112 receives the callback instruction information (YES in step S448), the communication connection switching unit 114 transmits communication-end request information to the second base-station apparatus 30.

Upon receiving communication-end notification information from the second base-station apparatus 30, the controller 11 transmits communication-start request information to the first base-station apparatus 20. At this point in time, the controller 11 maintains the connection with the second base-station apparatus 30. Thereafter, the flow proceeds to a process in step S450. When the communication-enabling permission obtaining unit 112 does not receive the callback instruction information (NO in step S448), it repeats the process in step S448.

In step S450, the controller 11 starts communication with the first base-station apparatus 20 by using resources indicated by the resource information included in the communication-start notification information received from the first base-station apparatus 20. Thereafter, the processing illustrated in FIG. 27 ends.

BRIEF SUMMARY

As described above, the first base-station apparatus 20 includes the communicator 22 that performs wireless communication and the controller 21. During communication with at least a first terminal apparatus (e.g., the terminal apparatus 10), in a first case in which a communication volume used for communication that is newly stated with a second terminal apparatus (e.g., the electronic equipment 40) becomes smaller than or equal to an un-used communication volume, the controller 21 transmits, to a target terminal apparatus (e.g., the terminal apparatus 10) that is one of the first terminal apparatus and the second terminal apparatus, a communication instruction for communication with a second base-station apparatus 30 that is different from the base-station apparatus and that has a coverage range in which the target terminal apparatus is located. In a second case in which a communication volume used for communication with the target terminal apparatus exceeds the un-used communication volume, the controller 21 transmits a callback instruction for callback from the second base-station apparatus to the base-station apparatus to the target terminal apparatus or the second base-station apparatus.

According to this configuration, with respect to the target terminal apparatus for which a base-station apparatus used for communication has been changed, the communication can be called back to a pre-changing base-station apparatus, while avoiding congestion. Accordingly, it is possible to improve the reliability of the entire communication system 1 or 2.

Also, when the first terminal apparatus is designated as the target terminal apparatus, the controller 21 may transmit, as a communication instruction, a switching instruction indicating switching from the first base-station apparatus 20 to the second base-station apparatus 30 and indicating the second base-station apparatus 30 as a base-station apparatus used for communication with the first terminal apparatus.

According to this configuration, the base-station apparatus used by the first terminal apparatus that has performed communication with the first base-station apparatus 20 is changed to the second base-station apparatus 30 to thereby make it possible to avoid congestion in the first base-station apparatus 20 and also make it possible to continue the communication.

Also, when the second terminal apparatus is designated as the target terminal apparatus, the controller 21 may transmit a communication instruction indicating the second base-station apparatus 30 as a base-station apparatus used for communication with the second terminal apparatus.

Since this configuration allows the second terminal apparatus attempting to communicate with the first base-station apparatus 20 to start communication with the second base-station apparatus 30, it is possible to cause the second terminal apparatus to start new communication while avoiding congestion in the first base-station apparatus 20.

Also, when the first base-station apparatus 20 belongs to a network to which the second base-station apparatus 30 belongs, the controller 21 may transmit a callback instruction to the second base-station apparatus 30 through the network in the second case described above.

According to this configuration, even when the first base-station apparatus 20 and the target terminal apparatus are not wirelessly connected to each other, it is possible to reliably call back the base-station apparatus used for communication from the second base-station apparatus 30 to the first base-station apparatus 20.

Also, when the first base-station apparatus 20 belongs to a network that is different from a network to which the second base-station apparatus 30 belongs, the controller 21 may maintain a connection with the target terminal apparatus after transmitting the communication instruction to the target terminal apparatus.

According to this configuration, even when the base-station apparatus used for communication is called back to the first base-station apparatus 20 after a callback instruction is received when the target terminal apparatus is communicating by using the second base-station apparatus 30, the callback to the first base-station apparatus 20 can be immediately realized without newly establishing a connection with the first base-station apparatus 20.

The controller 21 may also give higher priority to communication with the first base-station apparatus 20 for a terminal apparatus that uses a larger communication volume for communication.

According to this configuration, since it is possible to reduce the possibility that the switching of the base-station apparatus fails owing to an insufficient un-used communication volume for the communication volume used for communication, the reliability of the overall communication system 1 or 2 improves.

The controller 21 may give higher priority to communication between a terminal apparatus for stationary use and the first base-station apparatus 20 than to communication between the terminal apparatus 10 for mobile use and the first base-station apparatus 20.

According to this configuration, it is possible to reduce the possibility that switching of the base-station apparatus fails, regardless of whether or not a terminal apparatus for stationary use is located in the coverage range of another base-station apparatus. Accordingly, the reliability of the overall communication system 1 or 2 improves.

Also, the controller 21 may give higher priority to communication between a terminal apparatus 10 that does not support a communication system used by the second base-station apparatus 30 and the base-station apparatus 20 than to communication between a terminal apparatus 10 that supports the communication system and the base-station apparatus 20.

According to this configuration, it is possible to reduce the possibility that communication with the second base-station apparatus 30 is not allowed for the reason that the communication system used by the second base-station apparatus 30 is not supported and thus a connection with the second base-station apparatus 30 is not established. Accordingly, the reliability of the overall communication system 1 or 2 improves.

Although the embodiments of the present disclosure have been described above with reference to the accompanying drawings, specific configurations are not limited to those described above, and various changes in design and so on can be made within the scope that does not depart from the spirit of the present disclosure.

For example, in the first embodiment, during communication between the electronic equipment 40, which is an ultra-high-definition television, and the first base-station apparatus 20, there is a case in which the controller 21 receives communication-start request information from the terminal apparatus 10, and the communication-status determining unit 216 determines that higher priority is given to communication with the electronic equipment 40 than to communication with the terminal apparatus 10, as in the modification of the second embodiment illustrated in FIG. 24. In such a case, the controller 21 transmits communication instruction information that gives an instruction for communication using the second base-station apparatus 30 to the terminal apparatus 10. The controller 21 may break the connection with the terminal apparatus 10. There is also a case in which after ending communication with the electronic equipment 40, the communication-status determining unit 216 determines that the un-used communication volume is larger than the communication volume used for communication with the terminal apparatus 10. In such a case, the controller 21 may transmit callback instruction information to the second base-station apparatus 30, instead of transmitting, to the terminal apparatus 10, callback instruction information indicating callback from the second base-station apparatus 30 to the first base-station apparatus 20.

Although a case in which the terminal apparatus 10 is a mobile phone, and the electronic equipment 40 is an ultra-high-definition television has been described above by way of example, the present disclosure is not limited thereto. Types of terminal apparatus that can connect to each base-station apparatus or that can be connected thereto may be information terminal apparatuses in other forms, such as tablet terminal apparatuses, home appliances, such as refrigerators and air-conditioning equipment, and other IoT appliances. Also, as a result of new connection with one terminal apparatus, the number of connecting terminal apparatuses for which the serving base-station apparatus is to be switched may be increased to two or more. The terminal apparatuses for which callback is performed at a time may be all of terminal apparatuses for which the serving base-station apparatus is switched or may be one or some of the terminal apparatuses. This makes it possible to more flexibly distribute communication connections even in a case in which a plurality of pieces of equipment connects to one base-station apparatus to occupy a majority of resources that can be provided by the base-station apparatus. Accordingly, it is possible to enhance the efficiency of operations for avoiding congestion in the entire communication system 1 or 2.

In the terminal apparatus 10, the first receiving unit 121 and the first transmitting unit 122 may share one or more common antennas or may individually have one or more antennas. Also, the second receiving unit 123 and the second transmitting unit 124 may share one or more common antennas or may each have one or more antennas. All of the first receiving unit 121, the first transmitting unit 122, the second receiving unit 123, and the second transmitting unit 124 may share one or more common antennas.

In the first base-station apparatus 20, the first receiving unit 221 and the first transmitting unit 222 may share one or more common antennas or may each have one or more antennas. The second receiving unit 223 and the second transmitting unit 224 may share one or more common antennas or may each have one or more antennas. All of the first receiving unit 221, the first transmitting unit 222, the second receiving unit 223, and the second transmitting unit 224 may share one or more common antennas.

A portion (e.g., the controller 11) of the terminal apparatus 10 embodiment, a portion (e.g., the controller 21) of the first base-station apparatus 20, a portion (e.g., the controller 31) of the second base-station apparatus 30, and a portion of the electronic equipment 40 may each be realized by a computer including one or more processors, a storage medium, an input/output interface, a computer-readable recording medium, and so on. In such a case, the present disclosure may also be realized by recording a program for implementing each or all of the functions of those portions to a storage medium included in each apparatus, loading the recorded program into a computer system, and executing processing indicated by instructions written in the loaded program. The "computer system" as used herein refers to a computer system that is incorporated into the terminal apparatus 10, the first base-station apparatus 20, the second base-station apparatus 30, and the electronic equipment 40 and that includes an operating system (OS) and hardware, such as peripheral equipment. Each processor may be any of a CPU and a programmable logic device (PLD).

The "computer-readable recording medium" as used herein refers to a portable medium, such as a flexible disk, a magneto-optical disk, a read-only memory (ROM), or a compact disc read-only memory (CD®-ROM), or a storage device, such as a hard disk, built into a computer system. Further examples of the "computer-readable recording medium" may include a medium that dynamically holds a program for a short period of time and a medium that holds a program for a certain period of time. One example of the former medium is a communication line for transmitting a program through a network, such as the internet, or a communication channel, such as a telephone link, and one example of the latter medium is a volatile memory in a computer system that serves as a server or a client when the program is transmitted. The aforementioned program may be a program for realizing some of the above-described functions or may be a program that realizes the functions in combination with a program already recorded in the computer system.

The present disclosure contains subject matter related to that disclosed in Japanese Priority Patent Application JP 2019-018936 filed in the Japan Patent Office on Feb. 5, 2019, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A base-station apparatus comprising:
a communicator that performs wireless communication; and
a controller,
wherein, during communication with at least a first terminal apparatus, in a first case in which a communication volume used for communication that is newly stated with a second terminal apparatus becomes smaller than or equal to an un-used communication volume, the controller transmits, to a target terminal apparatus that is one of the first terminal apparatus and the second terminal apparatus, a communication instruction for communication with a second base-station apparatus that is different from the base-station apparatus and that has a coverage range in which the target terminal apparatus is located, and in a second case in which a communication volume used for communication with the target terminal apparatus exceeds the un-used communication volume, the controller transmits a callback instruction for callback from the second base-station apparatus to the base-station apparatus to the target terminal apparatus or the second base-station apparatus.

2. The base-station apparatus according to claim 1, wherein, when the first terminal apparatus is designated as the target terminal apparatus, the controller transmits, as the communication instruction, a switching instruction indicating switching from the base-station apparatus to the second base-station apparatus and indicating the second base-station apparatus as a base-station apparatus used for communication with the first terminal apparatus.

3. The base-station apparatus according to claim 1, wherein, when the second terminal apparatus is designated as the target terminal apparatus, the controller transmits the communication instruction indicating the second base-station apparatus as a base-station apparatus used for communication with second terminal apparatus.

4. The base-station apparatus according to claim 1, wherein, when the base-station apparatus belongs to a network to which the second base-station apparatus belongs,
the controller transmits the callback instruction to the second base-station apparatus through the network in the second case.

5. The base-station apparatus according to claim 1, wherein, when the base-station apparatus belongs to a network that is different from a network to which the second base-station apparatus belongs,
the controller maintains a connection with the target terminal apparatus after transmitting the communication instruction to the target terminal apparatus.

6. The base-station apparatus according to claim 1, wherein the controller gives higher priority to communication with the base-station apparatus for a terminal apparatus that uses a larger communication volume for communication.

7. The base-station apparatus according to claim 1, wherein the controller gives higher priority to communication between a terminal apparatus for stationary use and the base-station apparatus than to communication between a terminal apparatus for mobile use and the base-station apparatus.

8. The base-station apparatus according to claim 1, wherein the controller gives higher priority to communication between a terminal apparatus that does not support a communication system used by the second base-station apparatus and the base-station apparatus than to communication between a terminal apparatus that supports the communication system and the base-station apparatus.

9. A communication system comprising:
a first base-station apparatus; and
a second base-station apparatus,
wherein the first base-station apparatus comprises:
a communicator that performs wireless communication; and
a controller,
wherein, during communication with at least a first terminal apparatus, in a first case in which a communication volume used for communication that is newly stated with a second terminal apparatus becomes smaller than or equal to an un-used communication volume, the controller transmits, to a target terminal apparatus that is one of the first terminal apparatus and the second terminal apparatus, a communication instruction for communication with a second base-station apparatus that is different from the base-station apparatus and that has a coverage range in which the target terminal apparatus is located, and
in a second case in which a communication volume used for communication with the target terminal apparatus exceeds the un-used communication volume, the controller transmits a callback instruction for callback from the second base-station apparatus to the base-station apparatus to the target terminal apparatus or the second base-station apparatus.

10. A communication method for a base-station apparatus including a communicator that performs wireless communication, the communication method comprising:
transmitting, to a target terminal apparatus that is one of a first terminal apparatus and a second terminal apparatus, a communication instruction for communication with a second base-station apparatus that is different from the base-station apparatus and that has a coverage range in which the target terminal apparatus is located, in a first case in which a communication volume used for communication that is newly stated with the second terminal apparatus becomes smaller than or equal to an un-used communication volume during communication with at least the first terminal apparatus; and
transmitting, in a second case in which a communication volume used for communication with the target terminal apparatus exceeds the un-used communication volume, a callback instruction for callback from the second base-station apparatus to the base-station apparatus to the target terminal apparatus or the second base-station apparatus.

* * * * *